United States Patent
Choi et al.

(10) Patent No.: US 10,091,729 B2
(45) Date of Patent: *Oct. 2, 2018

(54) METHOD AND DEVICE FOR PERFORMING CHANNEL ACCESS IN WLAN SYSTEM

(71) Applicant: LG ELECTRONICS INC., Seoul (KR)

(72) Inventors: Jinsoo Choi, Anyang-si (KR); Hangyu Cho, Anyang-si (KR); Jeongki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,211

(22) Filed: Feb. 3, 2017

(65) Prior Publication Data

US 2017/0208547 A1 Jul. 20, 2017

Related U.S. Application Data

(63) Continuation of application No. 14/412,985, filed as application No. PCT/KR2013/007035 on Aug. 5, 2013, now Pat. No. 9,591,640.

(Continued)

(51) Int. Cl.
*H04W 52/02* (2009.01)
*H04W 72/12* (2009.01)
(Continued)

(52) U.S. Cl.
CPC ...... *H04W 52/0216* (2013.01); *H04B 7/0452* (2013.01); *H04W 4/70* (2018.02);
(Continued)

(58) Field of Classification Search
CPC ............. H04W 52/0216; H04W 4/005; H04W 72/1215; H04W 52/0238; H04W 72/121;
(Continued)

(56) References Cited

U.S. PATENT DOCUMENTS 9,521,671 B2 * 12/2016 Choi ................... H04W 72/121
9,591,640 B2 *  3/2017 Choi ................... H04W 72/121
(Continued)

FOREIGN PATENT DOCUMENTS

CN  1578242 A  2/2005
CN  1592266 A  3/2005
(Continued)

OTHER PUBLICATIONS

IEEE 802.11-13/0285r0, Resource Allocation Frame Format for RAW-based Medium Access, Mar. 2013.*

(Continued)

*Primary Examiner* — Christine Ng
(74) *Attorney, Agent, or Firm* — Dentons US LLP

(57) ABSTRACT

An embodiment of the present invention provides a method for performing channel access at an STA of a multiuser (MU) group in a wireless communication system, including receiving a resource assignment frame; and checking a group indicator field included in the resource assignment frame, wherein, if the group indicator field indicates that a slot assignment field for the MU group is present in the resource assignment frame, the STA determines a slot start offset based on the slot assignment field.

19 Claims, 16 Drawing Sheets

Related U.S. Application Data

(60) Provisional application No. 61/807,715, filed on Apr. 2, 2013, provisional application No. 61/805,932, filed on Mar. 28, 2013, provisional application No. 61/805,898, filed on Mar. 27, 2013.

(51) Int. Cl.
  *H04W 72/00* (2009.01)
  *H04W 72/04* (2009.01)
  *H04B 7/0452* (2017.01)
  *H04W 4/70* (2018.01)
  *H04W 74/06* (2009.01)
  *H04W 74/04* (2009.01)
  *H04L 29/12* (2006.01)
  *H04W 84/12* (2009.01)

(52) U.S. Cl.
  CPC ... *H04W 52/0219* (2013.01); *H04W 52/0235* (2013.01); *H04W 52/0238* (2013.01); *H04W 72/005* (2013.01); *H04W 72/0446* (2013.01); *H04W 72/121* (2013.01); *H04W 72/1215* (2013.01); *H04W 74/06* (2013.01); *H04L 61/2069* (2013.01); *H04W 74/04* (2013.01); *H04W 84/12* (2013.01); *Y02D 70/00* (2018.01); *Y02D 70/1222* (2018.01); *Y02D 70/1224* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/22* (2018.01)

(58) Field of Classification Search
  CPC .. H04W 72/0446; H04W 74/06; H04W 84/12
  See application file for complete search history.

(56) References Cited

U.S. PATENT DOCUMENTS

| | | |
|---|---|---|
| 2005/0157744 A1 | 7/2005 | Barratt et al. |
| 2005/0195781 A1 | 9/2005 | Ikeda |
| 2011/0164586 A1 | 7/2011 | Kim et al. |
| 2012/0026991 A1 | 2/2012 | Niu et al. |
| 2013/0064161 A1 | 3/2013 | Hedayat et al. |
| 2013/0128798 A1* | 5/2013 | Liu ................. H04W 48/12 370/312 |
| 2013/0195036 A1 | 8/2013 | Quan et al. |
| 2014/0071900 A1* | 3/2014 | Park ................. H04W 74/04 370/329 |
| 2014/0254497 A1* | 9/2014 | Ghosh ............... H04W 74/04 370/329 |
| 2015/0173075 A1* | 6/2015 | Choi ................. H04W 72/121 370/311 |
| 2015/0237623 A1* | 8/2015 | Choi ................. H04W 72/0446 370/329 |
| 2015/0382283 A1 | 12/2015 | Wang et al. |
| 2016/0021656 A1* | 1/2016 | Park ................... H04B 7/24 370/329 |

FOREIGN PATENT DOCUMENTS

| | | |
|---|---|---|
| CN | 1665202 A | 9/2005 |
| KR | 1020050003575 A | 1/2005 |
| KR | 20050024760 A | 3/2005 |
| KR | 20060135760 A | 12/2006 |
| RU | 2378760 C2 | 1/2010 |
| RU | 2452108 C2 | 5/2012 |
| WO | 2011/026151 A2 | 3/2011 |

OTHER PUBLICATIONS

GroupID Concept for Downlink MU-MIMO Transmission, IEEE 802.11-10/0073r1, Jan. 2010, 8 pages.
RAW Operation Improvement, IEEE 802.11-13/0290r0, Mar. 2013, 14 pages.
IEEE 802.11-13/0285r0, Resource Alllocation Frame Format for RAW-based Medium Access, Mar. 2013.
Park: "Specification Framework for TGah D13.x", IEEE 802.11-13/0354r0, XP068053814, IEEE SA Mentor, vol. 802.11ah, Piscataway, NJ, USA, Mar. 20, 2013, pp. 1-65.
Ghosh, et al.: "Resource Allocation Frame Format for RAW-based Medium Access", IEEE 802.11-13/0285r0, XP068053698, IEEE SA Mentor, vol. 802.11ah, Piscataway, NJ, USA, Mar. 18, 2013, pp. 1-11.
Lin X. Cai et al., 'A distributed multi-user MIMO MAC protocol for wireless local area networks', IEEE Globecom, pp. 1-5, Nov. 30-Dec. 4, 2008.

* cited by examiner

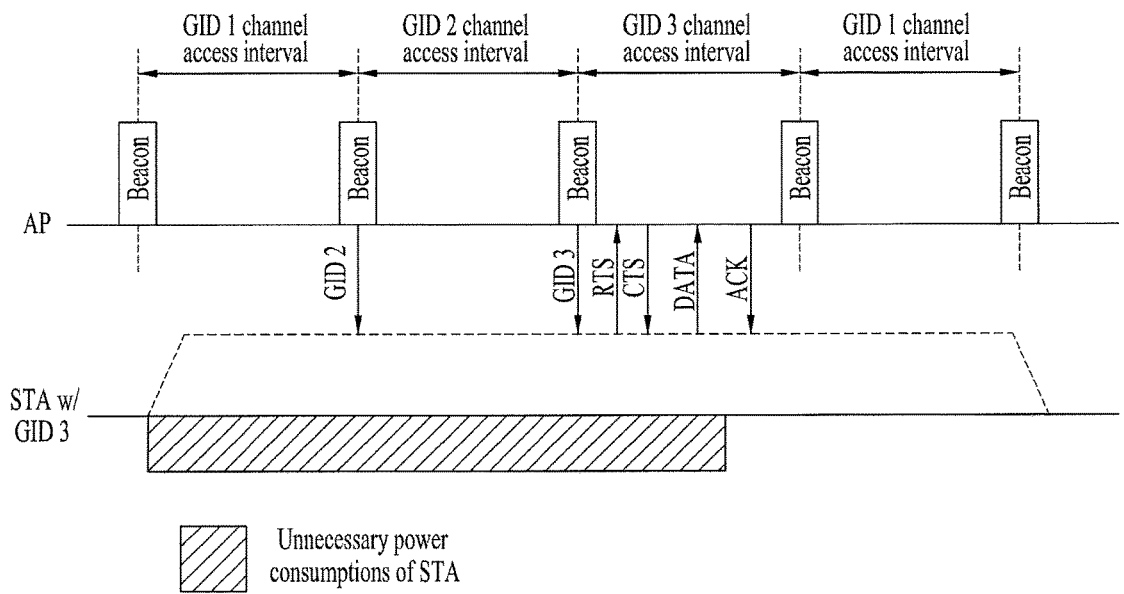

METHOD AND DEVICE FOR PERFORMING CHANNEL ACCESS IN WLAN SYSTEM

This application is a continuation of U.S. patent application Ser. No. 14/412,985 filed Jan. 5, 2015, now allowed, which is a 35 U.S.C. § 371 National Stage entry of International Application No. PCT/KR2013/007035 filed Aug. 5, 2013, which claims benefit of U.S. Provisional Nos. 61/805,898 filed Mar. 27, 2013; 61/805,932 filed Mar. 28, 2013; and 61/807,715 filed Apr. 2, 2013, all of which are incorporated by reference for all purposes as if fully set forth herein.

TECHNICAL FIELD

The following description relates to a wireless communication system and, more particularly, to a method and apparatus for accessing a channel in a wireless local area network (LAN) system.

BACKGROUND ART

Along with the development of information and communication technology, various wireless communication technologies have been developed. Thereamong, wireless local area network (WLAN) enables users to wirelessly access the Internet through their portable terminals such as personal digital assistants (PDAs), laptop computers, and portable multimedia players (PMPs) in homes, offices, or specific service areas, based on wireless frequency technology.

To overcome limits to communication speed, which are a weakness of WLAN, systems for increasing speed and reliability of a network and extending wireless network coverage have been introduced in recent technology standards. For example, IEEE 802.11n supports a high throughput (HT) of a data processing rate of up to 540 Mbps or higher and adopts multiple input and multiple output (MIMO) technology in both a transmitter and a receiver in order to minimize transmission errors and optimize data rate.

As next-generation communication technology, machine-to-machine (M2M) communication technology has been discussed. Even in an IEEE 802.11 WLAN system, technology standard for supporting M2M communication has been developed as IEEE 802.11ah. A scenario in which devices occasionally exchange less data at low speed in an environment in which many devices are present may be considered in M2M communication.

Communication in the WLAN is performed by a medium shared between all devices. If the number of devices increases as in M2M communication, efficiency of a channel access mechanism needs to be improved in order to reduce unnecessary power consumption and interference.

DISCLOSURE

Technical Problem

An object of the present is to provide an improved resource assignment frame structure in a WLAN system and a channel access method and apparatus of a station according to the resource assignment frame structure.

The technical objects that can be achieved through the present invention are not limited to what has been particularly described hereinabove and other technical objects not described herein will be more clearly understood by persons skilled in the art from the following detailed description.

Technical Solution

In a first technical aspect of the present invention, provided herein is a method for performing channel access at an STA of a multiuser (MU) group in a wireless communication system, including receiving a resource assignment frame; and checking a group indicator field included in the resource assignment frame, wherein, if the group indicator field indicates that a slot assignment field for the MU group is present in the resource assignment frame, the STA determines a slot start offset based on the slot assignment field.

In a second technical aspect of the present invention, provided herein is a station (STA) of a multiuser (MU) group for performing channel access in a wireless communication system, including a transceiver module; and a processor, wherein processor receives a resource assignment frame, checks a group indicator field, and, if the group indicator field indicates that a slot assignment field for the MU group is present, determines a slot start offset based on the slot assignment field.

The first and second technical aspects of the present invention may include the following.

If the group indicator field indicates that a slot assignment field for the MU group is present in the resource assignment frame, the method may further include checking a first bit of the slot assignment field; and comparing a next subfield of a subfield corresponding to the first bit with a group ID of the STA.

If the next subfield corresponds to the group ID of the STA, the method may further include obtaining a start time of medium access from a last subfield of the slot assignment field; and transmitting a power save-poll (PS-Poll) frame after contention at the start time of medium access.

If the next subfield does not correspond to the group ID of the STA and if the first bit indicates that the slot assignment field is a last slot assignment field for the MU group, the STA may disregard slot assignment fields after the assignment field.

If the next subfield does not correspond to the group ID of the STA and if the first bit indicates that the slot assignment field is not a last slot assignment field for the MU group, the STA may compare a second subfield of a next slot assignment field of the slot assignment field with the group ID of the STA.

The slot assignment field for the MU group may be located starting from a start part of one or more slot assignment fields included in the resource assignment frame.

If the group indicator field indicates that a slot assignment field for the MU group is not present in the resource assignment frame, the STA may disregard all slot assignment fields included in the group indicator field.

The all slot assignment fields may be slot assignment fields for each (assigned) STA.

If the group indicator field indicates that a slot assignment field for the MU group is present in the resource assignment frame, the resource assignment frame may include both at least one slot assignment field for the MU group and zero or more slot assignment fields for each (assigned) STA.

If the group indicator field indicates that a slot assignment field for the MU group is not present in the resource assignment frame, the resource assignment frame may include only a slot assignment field for each (assigned) STA.

The slot assignment field for each (assigned) STA may include a uplink (UL)/downlink (DL) indicator subfield, a partial association identifier (AID) subfield, and a slot start offset subfield.

The next subfield may be a group ID subfield and the last subfield may be a slot start offset subfield.

The MU group may be a set of STAs for MU multiple input and multiple output (MIMO).

Advantageous Effects

According to the present invention, efficient channel access can be performed through an improved resource assignment frame structure in a WLAN system.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIGS. 14 to 16 are diagrams illustrating exemplary operations of an STA in the case in which a group channel access interval is set.

FIGS. 17 (a), (b) and (c) and FIGS. 18 (a), (b) and (c) are diagrams for explaining an RPS element.

BEST MODE

Figure 1:
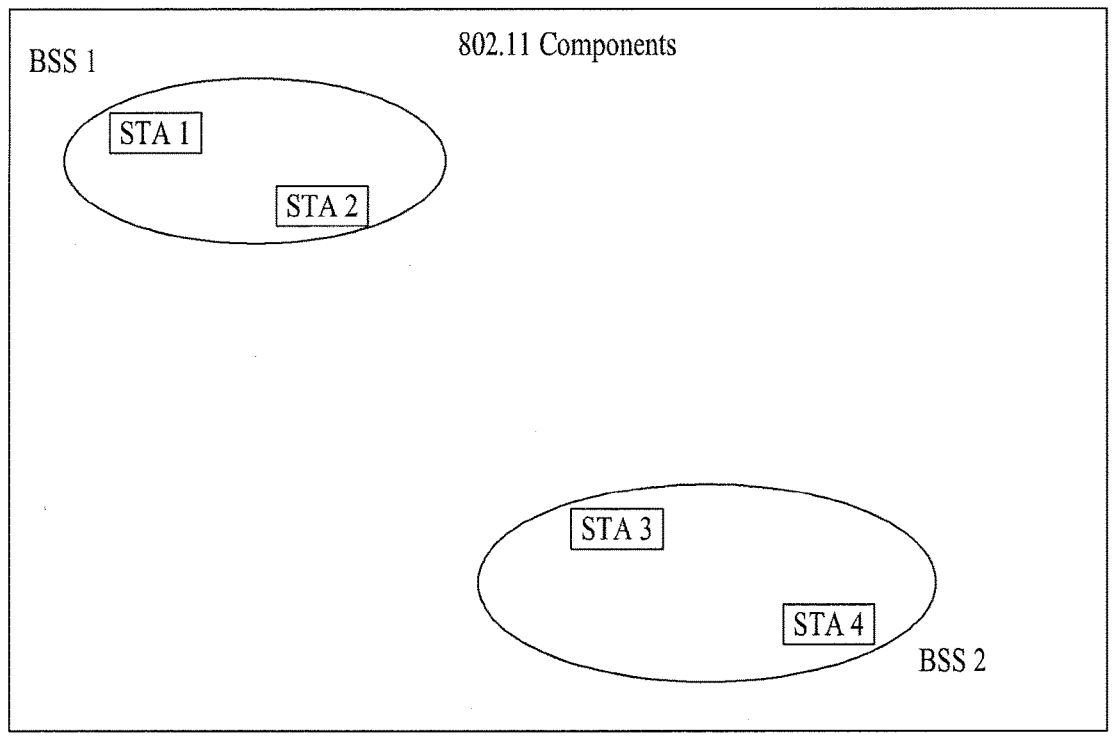
FIG. 1 is a diagram showing an exemplary structure of an IEEE 802.11 system to which the present invention is applicable.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, evolved-UTRA (E-UTRA), etc. For clarity, the present disclosure focuses on 3GPP LTE and LTE-A systems. However, the technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent station (STA) mobility for a higher layer may be provided by mutual operations of the components. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a type of LAN may be configured as necessary instead of being prescheduled and is also called an ad-hoc network.

Memberships of an STA in the BSS may be dynamically changed when the STA becomes an on or off state or the STA enters or leaves a region of the BSS. To become a member of the BSS, the STA may use a synchronization process to join the BSS. To access all services of a BSS infrastructure, the STA should be associated with the BSS. Such association may be dynamically configured and may include use of a distributed system service (DSS).

Figure 2:
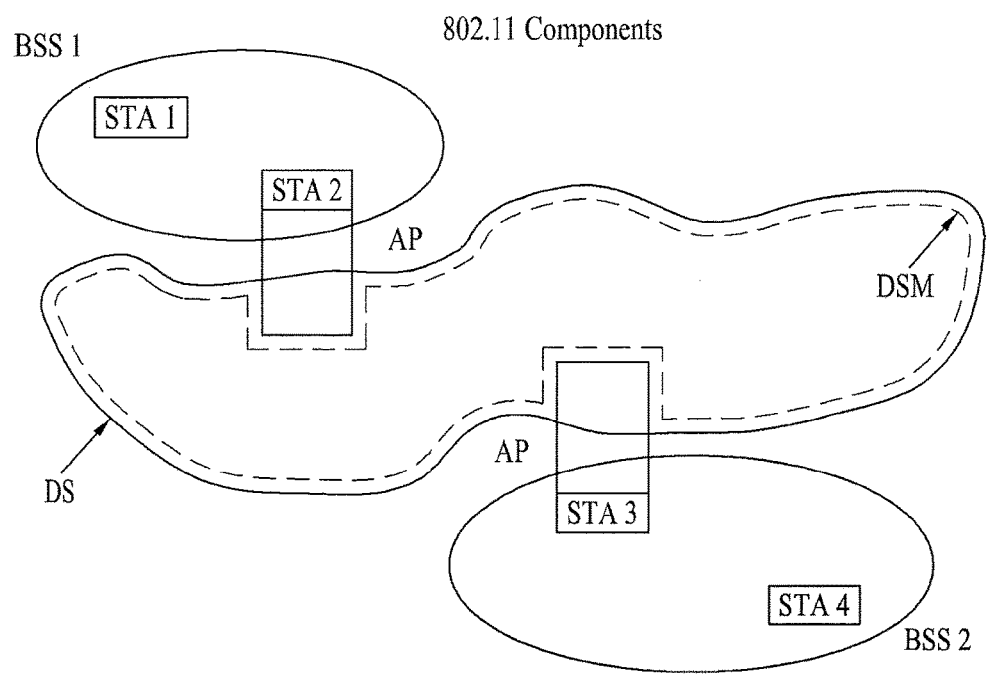
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a wireless medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may be always received by an uncontrolled port and may be processed by an IEEE 802.1X port access entity. If the controlled port is authenticated, transmission data (or frame) may be transmitted to the DS.

Figure 3:
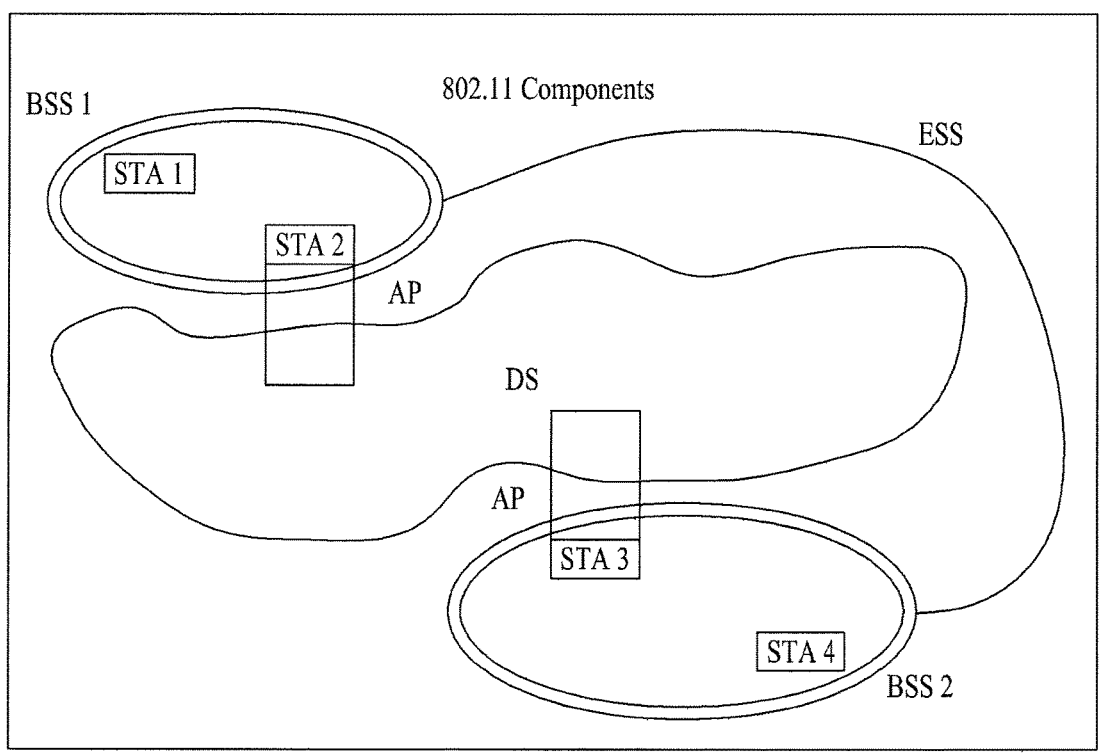
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS networks may be physically located in the same space as one (or more than one) ESS network. This may correspond to an ESS network form in the case in which an ad-hoc network operates in a location in which an ESS network is present, the case in which IEEE 802.11 networks different organizations physically overlap, or the case in which two or more different access and security policies are necessary in the same location.

Figure 4:
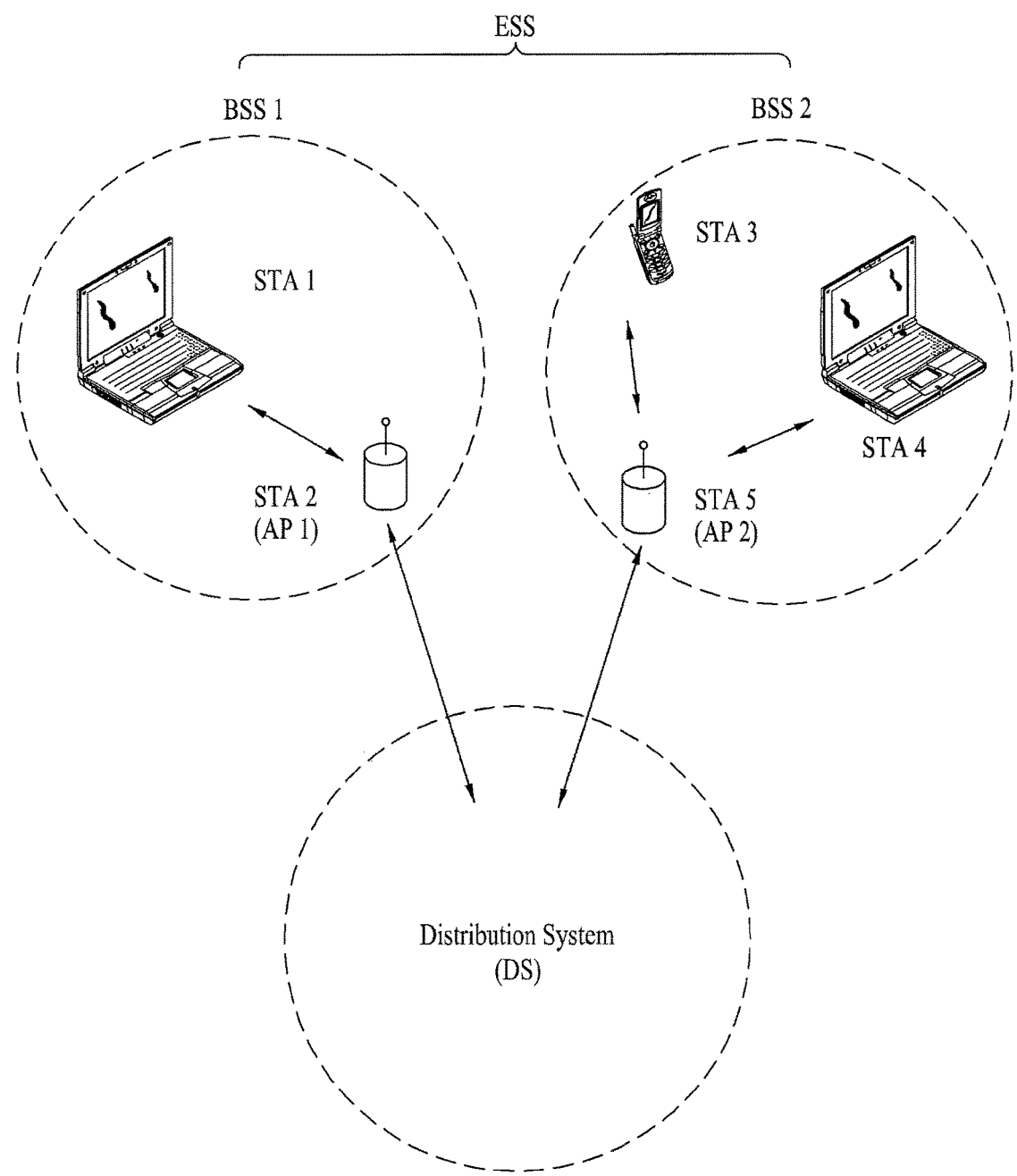
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (eNB), a base transceiver system (BTS), or a femto BS in other wireless communication fields.

Link Setup Process

Figure 5:
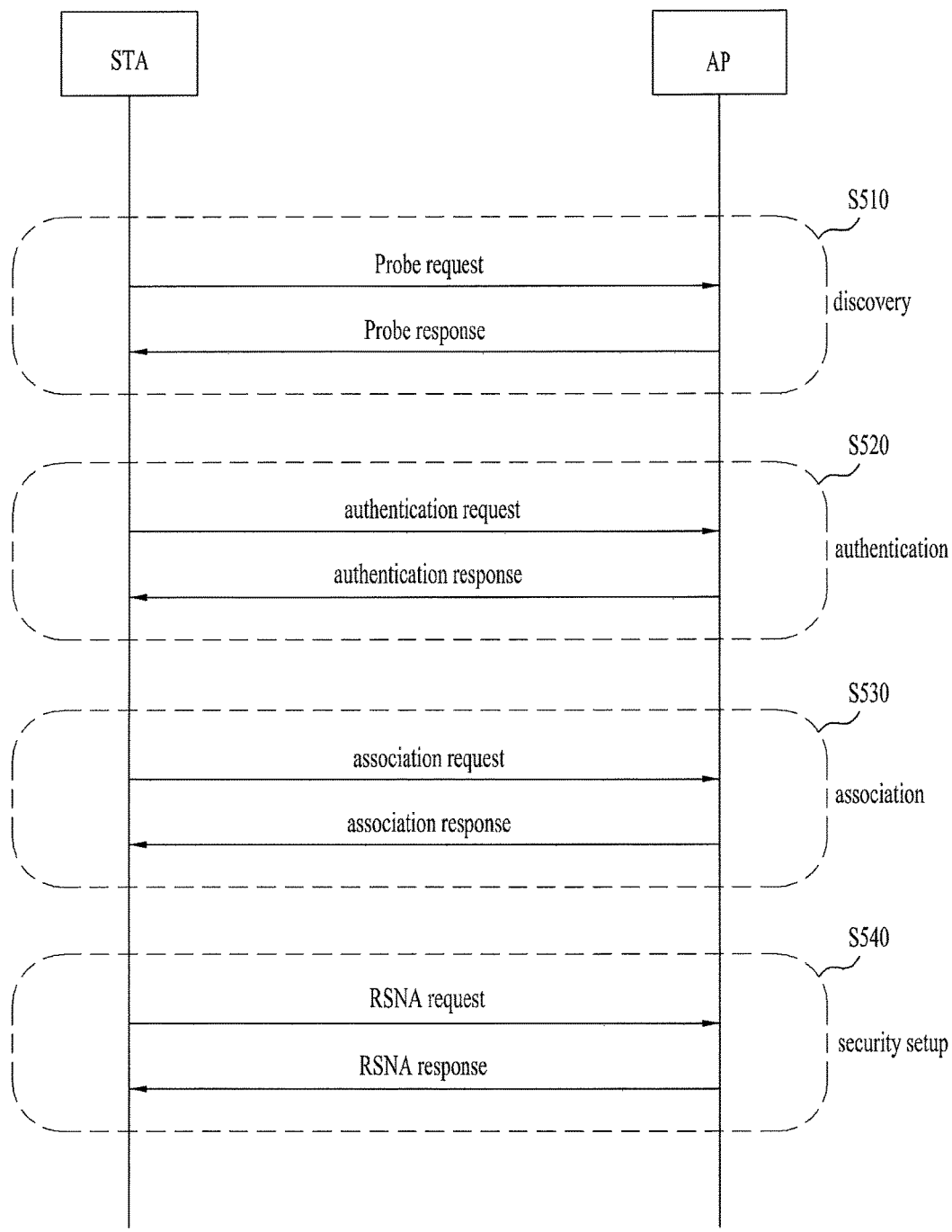
FIG. 5 is a diagram for explaining a link setup process in a WLAN system.

FIG. 5 is a diagram for explaining a general link setup process.

In order to allow an STA to establish link setup on a network and transmit/receive data over the network, the STA should perform processes of network discovery, authentication, association establishment, security setup, etc. The link setup process may also be referred to as a session initiation processor or a session setup process. In addition, discovery, authentication, association, and security setup of the link setup process may also called an association process.

An exemplary link setup process is described with reference to FIG. 5.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning.

FIG. 5 exemplarily illustrates a network discovery action including an active scanning process. An STA performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. Since an AP transmits a beacon frame in a BSS, the AP is a responder. In an IBSS, since STAs of the IBSS sequentially transmit the beacon frame, a responder is not the same. For example, an STA, that has transmitted the probe request frame at channel #1 and has received the probe response frame at channel #1, stores BSS-related information contained in the received probe response frame, and moves to the next channel (e.g. channel #2). In the same manner, the STA may perform scanning (i.e. probe request/response transmission and reception at Channel #2).

Although not shown in FIG. 5, the scanning action may also be carried out using passive scanning. An STA that performs passive scanning awaits reception of a beacon frame while moving from one channel to another channel. The beacon frame is one of management frames in IEEE 802.11. The beacon frame is periodically transmitted to indicate the presence of a wireless network and allow a scanning STA to search for the wireless network and thus join the wireless network. In a BSS, an AP is configured to periodically transmit the beacon frame and, in an IBSS, STAs in the IBSS are configured to sequentially transmit the beacon frame. Upon receipt of the beacon frame, the scanning STA stores BSS-related information contained in the beacon frame and records beacon frame information on each channel while moving to another channel. Upon receiving the beacon frame, the STA may store BSS-related information contained in the received beacon frame, move to the next channel, and perform scanning on the next channel using the same method.

Active scanning is more advantageous than passive scanning in terms of delay and power consumption.

After discovering the network, the STA may perform an authentication process in step S520. The authentication process may be referred to as a first authentication process in order to clearly distinguish this process from the security setup process of step S540.

The authentication process includes a process in which an STA transmits an authentication request frame to an AP and the AP transmits an authentication response frame to the STA in response to the authentication request frame. The authentication frame used for authentication request/response corresponds to a management frame.

The authentication frame may include information about an authentication algorithm number, an authentication transaction sequence number, a state code, a challenge text, a robust security network (RSN), a finite cyclic group (FCG), etc. The above-mentioned information contained in the authentication frame may correspond to some parts of information capable of being contained in the authentication request/response frame and may be replaced with other information or include additional information.

The STA may transmit the authentication request frame to the AP. The AP may determine whether to permit authentication for the corresponding STA based on the information contained in the received authentication request frame. The AP may provide an authentication processing result to the STA through the authentication response frame.

After the STA has been successfully authenticated, an association process may be carried out in step S530. The association process includes a process in which the STA transmits an association request frame to the AP and the AP transmits an association response frame to the STA in response to the association request frame.

For example, the association request frame may include information associated with various capabilities, a beacon listen interval, a service set identifier (SSID), supported rates, supported channels, an RSN, a mobility domain, supported operating classes, a traffic indication map (TIM) broadcast request, interworking service capability, etc.

For example, the association response frame may include information associated with various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame and may be replaced with other information or include additional information.

After the STA has been successfully associated with the network, a security setup process may be performed in step S540. The security setup process of step S540 may be referred to as an authentication process based on robust security network association (RSNA) request/response. The authentication process of step S520 may be referred to as a first authentication process and the security setup process of step S540 may also be simply referred to as an authentication process.

The security setup process of step S540 may include a private key setup process through 4-way handshaking based on, for example, an extensible authentication protocol over LAN (EAPOL) frame. In addition, the security setup process may also be performed according to other security schemes not defined in IEEE 802.11 standards.

WLAN Evolution

To overcome limitations of communication speed in a WLAN, IEEE 802.11n has recently been established as a communication standard. IEEE 802.11n aims to increase network speed and reliability and extend wireless network coverage. More specifically, IEEE 802.11n supports a high throughput (HT) of 540 Mbps or more. To minimize transmission errors and optimize data rate, IEEE 802.11n is based on MIMO using a plurality of antennas at each of a transmitter and a receiver.

With widespread supply of a WLAN and diversified applications using the WLAN, the necessity of a new WLAN system for supporting a higher processing rate than a data processing rate supported by IEEE 802.11n has recently emerged. A next-generation WLAN system supporting very high throughput (VHT) is one of IEEE 802.11 WLAN systems which have been recently proposed to support a data processing rate of 1 Gbps or more in a MAC service access point (SAP), as the next version (e.g. IEEE 802.11ac) of an IEEE 802.11n WLAN system.

To efficiently utilize a radio frequency (RF) channel, the next-generation WLAN system supports a multiuser (MU)-MIMO transmission scheme in which a plurality of STAs simultaneously accesses a channel. In accordance with the MU-MIMO transmission scheme, an AP may simultaneously transmit packets to at least one MIMO-paired STA.

In addition, support of WLAN system operations in whitespace (WS) has been discussed. For example, technology for introducing the WLAN system in TV WS such as an idle frequency band (e.g. 54 to 698 MHz band) due to transition to digital TVs from analog TVs has been discussed under the IEEE 802.11af standard. However, this is for illustrative purposes only, and the WS may be a licensed band capable of being primarily used only by a licensed user. The licensed user is a user who has authority to use the licensed band and may also be referred to as a licensed device, a primary user, an incumbent user, etc.

For example, an AP and/or STA operating in WS should provide a function for protecting the licensed user. As an example, assuming that the licensed user such as a microphone has already used a specific WS channel which is a frequency band divided by regulations so as to include a specific bandwidth in the WS band, the AP and/or STA cannot use the frequency band corresponding to the corresponding WS channel in order to protect the licensed user. In addition, the AP and/or STA should stop using the corresponding frequency band under the condition that the licensed user uses a frequency band used for transmission and/or reception of a current frame.

Therefore, the AP and/or STA needs to determine whether a specific frequency band of a WS band can be used, in other words, whether a licensed user is present in the frequency band. A scheme for determining whether a licensed user is present in a specific frequency band is referred to as spectrum sensing. An energy detection scheme, a signature detection scheme, etc. are used as the spectrum sensing mechanism. The AP and/or STA may determine that the frequency band is being used by a licensed user if the intensity of a received signal exceeds a predetermined value or if a DTV preamble is detected.

Machine-to-machine (M2M) communication technology has been discussed as next generation communication technology. Technical standard for supporting M2M communication has been developed as IEEE 802.11ah in an IEEE 802.11 WLAN system. M2M communication refers to a communication scheme including one or more machines or may also be called machine type communication (MTC) or machine-to-machine communication. In this case, the machine refers to an entity that does not require direct manipulation or intervention of a user. For example, not only a meter or vending machine including a radio communication module but also a user equipment (UE) such as a smartphone capable of performing communication by automatically accessing a network without user manipulation/intervention may be machines. M2M communication may include device-to-device (D2D) communication and communication between a device and an application server. As exemplary communication between a device and an application server, communication between a vending machine and an application server, communication between a point of sale (POS) device and an application server, and communication between an electric meter, a gas meter, or a water meter and an application server. M2M communication-based applications may include security, transportation, healthcare, etc. In the case of considering the above-mentioned application examples, M2M communication has to support occasional transmission/reception of a small amount of data at low speed under an environment including a large number of devices.

More specifically, M2M communication should support a large number of STAs. Although a currently defined WLAN system assumes that one AP is associated with a maximum of 2007 STAs, methods for supporting other cases in which more STAs (e.g. about 6000 STAs) than 2007 STAs are associated with one AP have been discussed in M2M communication. In addition, it is expected that many applications for supporting/requesting a low transfer rate are present in M2M communication. In order to smoothly support these requirements, an STA in the WLAN system may recognize the presence or absence of data to be transmitted thereto based on a TIM element and methods for reducing the bitmap size of the TIM have been discussed. In addition, it is expected that much traffic having a very long transmission/reception interval is present in M2M communication. For example, a very small amount of data such as electric/gas/water metering needs to be transmitted and received at long intervals (e.g. every month). Accordingly, although the number of STAs associated with one AP increases in the WLAN system, methods for efficiently supporting the case in which there are a very small number of STAs each including a data frame to be received from the AP during one beacon period has been discussed.

As described above, WLAN technology is rapidly developing and not only the above-mentioned exemplary technologies but also other technologies including direct link setup, improvement of media streaming throughput, support of high-speed and/or large-scale initial session setup, and support of extended bandwidth and operating frequency are being developed.

Medium Access Mechanism

In a WLAN system based on IEEE 802.11, a basic access mechanism of medium access control (MAC) is a carrier sense multiple access with collision avoidance (CSMA/CA) mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may sense a wireless channel or a medium during a predetermined time duration (e.g. DCF interframe space (DIFS) before starting transmission. As a result of sensing, if it is determined that the medium is in an idle status, the AP and/or the STA starts frame transmission using the medium. Meanwhile, if it is sensed that the medium is in an occupied state, the AP and/or the STA does not start its transmission and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving QoS of a WLAN and QoS data may be transmitted in both a contention period (CP) and a contention-free period (CFP).

Figure 6:
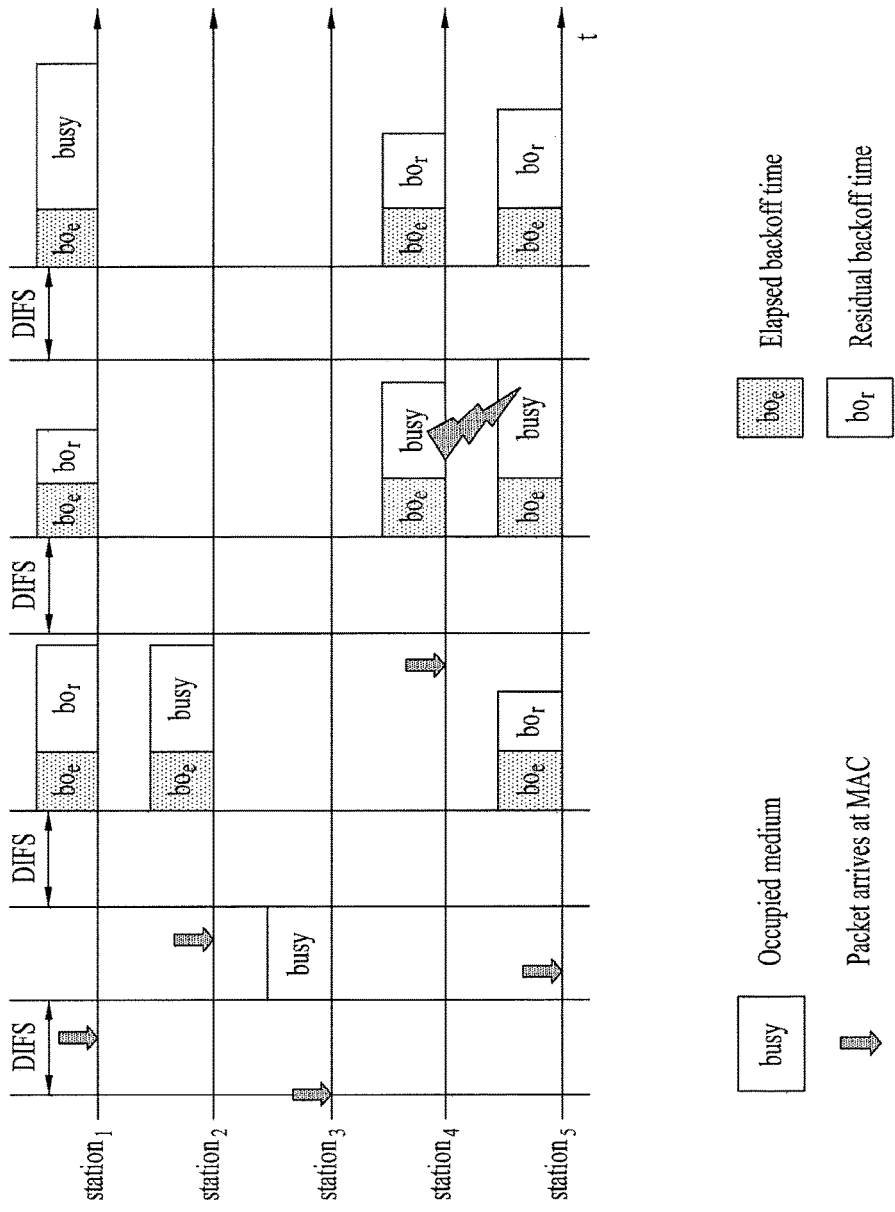
FIG. 6 is a diagram for explaining a backoff process.

FIG. 6 is a diagram for explaining a backoff process.

Operations based on a random backoff period will now be described with reference to FIG. 6. If a medium of an occupy or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to one of 0 to CW values. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. Desirably, CW, CWmin, and CWmax are set to $2^n-1$ (where n=0, 1, 2, . . . ).

If the random backoff process is started, the STA continuously monitors the medium while counting down the backoff slot in response to the determined backoff count value. If the medium is monitored as the occupied state, the countdown stops and waits for a predetermined time. If the medium is in the idle status, the remaining countdown restarts.

As shown in the example of FIG. 6, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each STA waits for the DIFS time and then may perform countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a predetermined time DIFS and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 6 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may increase the CW value by two times, select a random backoff count value, and then perform countdown. Meanwhile, STA1 waits for a predetermined time while the medium is in the occupied state due to transmission of STA4 and STA5. If the medium is in the idle state, STA1 may wait for the DIFS time and then start frame transmission after lapse of the residual backoff time.

STA Sensing Operation

As described above, the CSMA/CA mechanism includes not only a physical carrier sensing mechanism in which the AP and/or an STA directly senses a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used to indicate a time remaining until an AP and/or an STA which is currently using the medium or has authority to use the medium enters an available state to another AP and/or STA. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, NAV may be set according to the value of a 'duration' field of a MAC header of a frame.

A robust collision detection mechanism has been proposed to reduce the probability of collision. This will be described with reference to FIGS. 7 and 8. Although an actual carrier sensing range is different from a transmission range, it is assumed that the actual carrier sensing range is identical to the transmission range for convenience of description.

Figure 7:
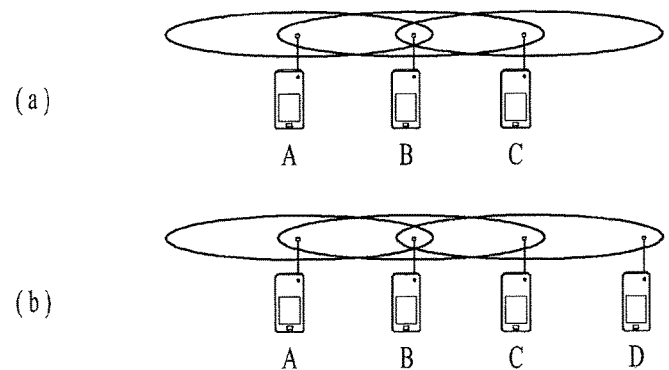
FIGS. 7 (a) and (b) are diagrams for explaining a hidden node and an exposed node.

FIG. 7 is a diagram for explaining a hidden node and an exposed node.

FIG. 7(a) exemplarily shows a hidden node. In FIG. 7(a), STA A communicates with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in occurrence of collision. Here, STA A may be considered a hidden node of STA C.

FIG. 7(b) exemplarily shows an exposed node. In FIG. 7(b), in a situation in which STA B transmits data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 8:
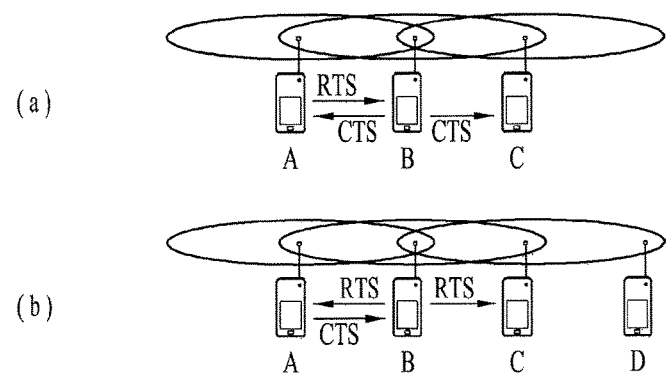
FIGS. 8 (a) and (b) are diagrams for explaining request to send (RTS) and clear to send (CTS).

FIG. 8 is a diagram for explaining request to send (RTS) and clear to send (CTS).

To efficiently utilize a collision avoidance mechanism under the above-mentioned situation of FIG. 7, it is possible to use a short signaling packet such as RTS and CTS. RTS/CTS between two STAs may be overheard by peripheral STA(s), so that the peripheral STA(s) may consider whether information is transmitted between the two STAs. For example, if an STA to be used for data transmission transmits an RTS frame to an STA receiving data, the STA receiving data may inform peripheral STAs that itself will receive data by transmitting a CTS frame to the peripheral STAs.

FIG. 8(a) exemplarily shows a method for solving problems of a hidden node. In FIG. 8(a), it is assumed that both STA A and STA C are ready to transmit data to STA B. If STA A transmits RTS to STA B, STA B transmits CTS to each of STA A and STA C located in the vicinity of the STA B. As a result, STA C waits for a predetermined time until STA A and STA B stop data transmission, thereby avoiding collision.

FIG. 8(b) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all peripheral STAs and only STA A having data to be actually transmitted may transmit CTS. STA C receives only the RTS and does not receive the CTS of STA A, so that it can be recognized that STA A is located outside of the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
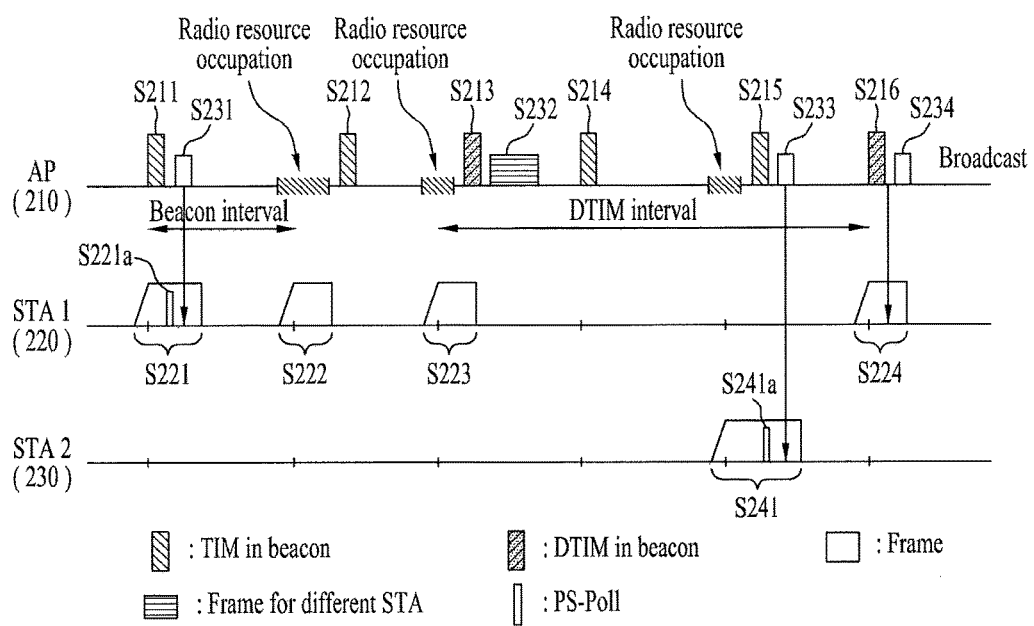
FIG. 9 is a diagram for explaining a power management operation.

FIG. 9 is a diagram for explaining a PM operation.

Referring to FIG. 9, an AP 210 transmits a beacon frame to STAs present in a BSS at intervals of a predetermined time period (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1 220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame, to the AP 210 (S221a). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element configured as a DTIM. However, since the busy medium state is given, the AP 210 transmits the beacon frame at a delayed time (S213). STA1220 is switched to the awake state in response to the beacon interval and may obtain a DTIM through the beacon frame transmitted by the AP 210. It is assumed that the DTIM obtained by STA1 220 does not have a frame to be transmitted to STA1 220 and there is a frame for another STA. In this case, STA1 220 may confirm the absence of a frame to be received in the STA1 220 and re-enters the sleep state so that the STA1 220 may operate in the sleep state. After transmitting the beacon frame, the AP 210 transmits the frame to the corresponding STA (S232).

The AP 210 fourthly transmits the beacon frame (S214). However, since it was impossible for STA1 220 to obtain information regarding the presence of buffered traffic associated therewith through previous double reception of a TIM element, STA1 220 may adjust the wakeup interval for receiving the TIM element. Alternatively, provided that signaling information for coordination of the wakeup interval value of STA1 220 is contained in the beacon frame transmitted by the AP 210, the wakeup interval value of the STA1220 may be adjusted. In this example, STA1 220, which has been switched to receive a TIM element every beacon interval, may be configured to be switched to another operation state in which STA1 220 awakes from the sleep state once every three beacon intervals. Therefore, when the AP 210 transmits a fourth beacon frame (S214) and transmits a fifth beacon frame (S215), STA1 220 maintains the sleep state such that it cannot obtain the corresponding TIM element.

When the AP 210 sixthly transmits the beacon frame (S216), STA1 220 is switched to the awake state and operates in the awake state, so that the STA1 220 may obtain the TIM element contained in the beacon frame (S224). The TIM element is a DTIM indicating the presence of a broadcast frame. Accordingly, STA1 220 does not transmit the PS-Poll frame to the AP 210 and may receive the broadcast frame transmitted by the AP 210 (S234). In the meantime, the wakeup interval configured for STA2 230 may be longer than the wakeup interval of STA1 220. Accordingly, STA2 230 may enter the awake state at a specific time (S215) where the AP 210 fifthly transmits the beacon frame and receives the TIM element (S241). STA2 230 may recognize the presence of a frame to be transmitted thereto through the TIM element and transmit the PS-Poll frame to the AP 210 to request frame transmission (S241a). The AP 210 may transmit the frame to STA2 230 in response to the PS-Poll frame (S233).

In order to manage a PS mode shown in FIG. 9, the TIM element may include either a TIM indicating the presence or absence of a frame to be transmitted to the STA or include a DTIM indicating the presence or absence of a broadcast/ multicast frame. The DTIM may be implemented through field setting of the TIM element.

Figure 10:
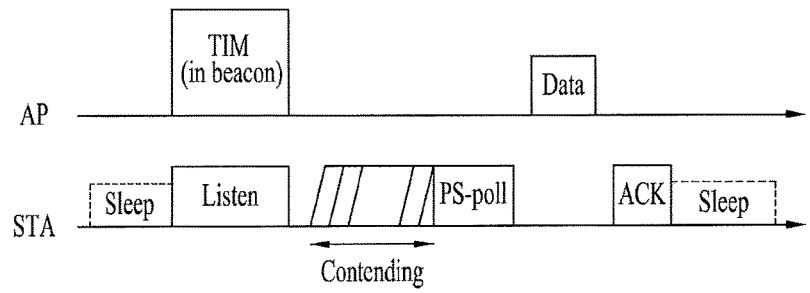
FIGS. 10 to 12 are diagrams for explaining detailed operations of an STA that has received a TIM.
Figure 11:
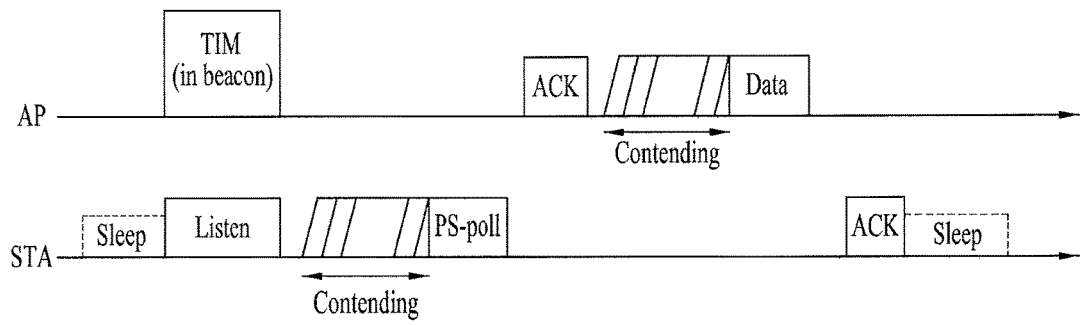
Figure 12:
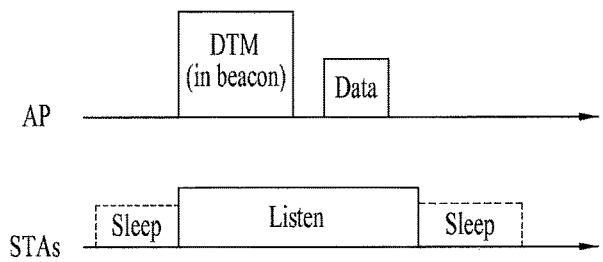

FIGS. 10 to 12 are diagrams for explaining detailed operations of an STA that has received a TIM.

Referring to FIG. 10, an STA is switched from a sleep state to an awake state so as to receive a beacon frame including a TIM from an AP. The STA may recognize the presence of buffered traffic to be transmitted thereto by interpreting the received TIM element. After contending with other STAs to access a medium for PS-Poll frame transmission, the STA may transmit the PS-Poll frame for requesting data frame transmission to the AP. Upon receiving the PS-Poll frame transmitted by the STA, the AP may transmit the frame to the STA. The STA may receive a data frame and then transmit an ACK frame to the AP in response to the received data frame. Thereafter, the STA may re-enter the sleep state.

As illustrated in FIG. 10, the AP may operate according to an immediate response scheme in which the AP receives the PS-Poll frame from the STA and transmits the data frame after a predetermined time (e.g. a short interframe space (SIFS)). Meanwhile, if the AP does not prepare a data frame to be transmitted to the STA during the SIFS time after receiving the PS-Poll frame, the AP may operate according to a deferred response scheme and this will be described with reference to FIG. 11.

The STA operations of FIG. 11 in which an STA is switched from a sleep state to an awake state, receives a TIM from an AP, and transmits a PS-Poll frame to the AP through contention are identical to those of FIG. 10. Even upon receiving the PS-Poll frame, if the AP does not prepare a data frame during an SIFS time, the AP may transmit an ACK frame to the STA instead of transmitting the data frame. If the data frame is prepared after transmission of the ACK frame, the AP may transmit the data frame to the STA after completion of contention. The STA may transmit the ACK frame indicating that the data frame has successfully been received to the AP and transition to the sleep state.

FIG. 12 illustrates an exemplary case in which an AP transmits a DTIM. STAs may be switched from the sleep state to the awake state so as to receive a beacon frame including a DTIM element from the AP. The STAs may recognize that a multicast/broadcast frame will be transmitted through the received DTIM. After transmission of the beacon frame including the DTIM, the AP may directly transmit data (i.e. the multicast/broadcast frame) without transmitting/receiving a PS-Poll frame. While the STAs continuously maintains the awake state after reception of the beacon frame including the DTIM, the STAs may receive data and then switch to the sleep state after completion of data reception.

TIM Structure

In the operation and management method of the PS mode based on the TIM (or DTIM) protocol described with reference to FIGS. 9 to 12, STAs may determine whether a data frame to be transmitted for the STAs through STA identification information contained in a TIM element. The STA identification information may be information associated with an AID to be allocated when an STA is associated with an AP.

The AID is used as a unique ID of each STA within one BSS. For example, the AID for use in the current WLAN system may be allocated as one of 1 to 2007. In the currently defined WLAN system, 14 bits for the AID may be allocated to a frame transmitted by an AP and/or an STA. Although the AID value may be assigned up to 16383, the values of 2008 to 16383 are set to reserved values.

A TIM element according to legacy definition is inappropriate to apply an M2M application through which many STAs (for example, more than 2007 STAs) are associated with one AP. If a conventional TIM structure is extended without any change, since the TIM bitmap size excessively increases, it is impossible to support the extended TIM structure using a legacy frame format and the extended TIM structure is inappropriate for M2M communication in which application of a low transfer rate is considered. In addition, it is expected that there are a very small number of STAs each having a reception data frame during one beacon period. Therefore, according to exemplary application of the above-mentioned M2M communication, since it is expected that most bits are set to zero (0) although the TIM bitmap size is increased, technology capable of efficiently compressing a bitmap is needed.

In legacy bitmap compression technology, successive values of 0 are omitted from a front part of a bitmap and the omitted result may be defined as an offset (or start point) value. However, although STAs each including a buffered frame is small in number, if there is a high difference between AID values of respective STAs, compression efficiency is not high. For example, assuming that only a frame to be transmitted to two STAs having AID values of 10 and 2000 is buffered, the length of a compressed bitmap is set to 1990 but the remaining parts other than both end parts are assigned zero. If fewer STAs are associated with one AP, inefficiency of bitmap compression does not cause serious problems. However, if the number of STAs associated with one AP increases, such inefficiency may deteriorate overall system performance.

Figure 13:
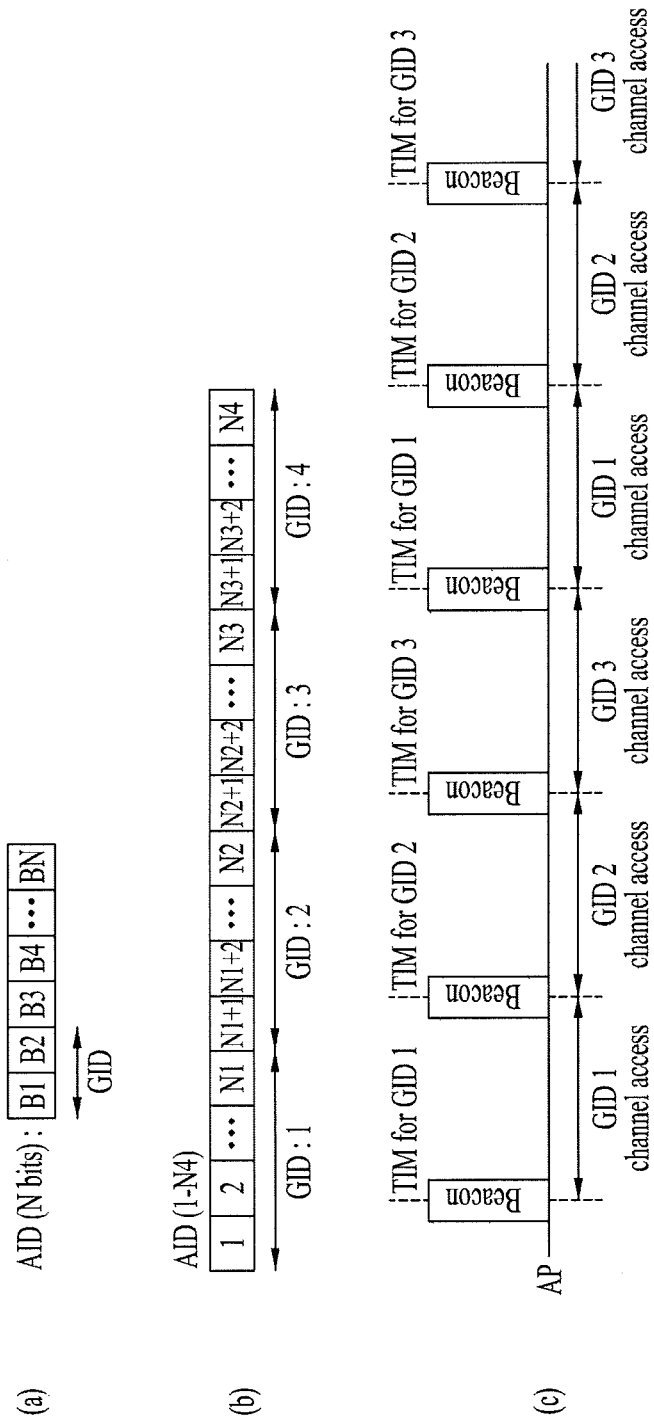
FIGS. 13 (a), (b) and (c) are diagrams for explaining a group-based AID.

In order to solve the above-mentioned problems, AIDs are divided into a plurality of groups such that data can be more efficiently transmitted. A designated group ID (GID) is allocated to each group. AIDs allocated on a group basis will be described with reference to FIG. 13.

FIG. 13(a) is a diagram illustrating an exemplary group-based AID. In FIG. 13(a), a few bits located at the front part of an AID bitmap may be used to indicate a GID. For example, it is possible to designate four GIDs using the first two bits of an AID bitmap. If a total length of the AID bitmap is N bits, the first two bits (B1 and B2) may represent a GID of the corresponding AID.

FIG. 13(a) is a diagram illustrating another exemplary group-based AID. In FIG. 13(b), a GID may be allocated according to the position of the AID. In this case, AIDs having the same GID may be represented by offset and length values. For example, if GID 1 is denoted by offset A and length B, this means that AIDs of A to A+B−1 on a bitmap have GID 1. For example, FIG. 13(b) assumes that AIDs of 1 to N4 are divided into four groups. In this case, AIDs contained in GID 1 are denoted by 1 to N1 and the AIDs contained in this group may be represented by offset 1 and length N1. Next, AIDs contained in GID 2 may be represented by offset N1+1 and length N2−N1+1, AIDs contained in GID 3 may be represented by offset N2+1 and length N3−N2+1, and AIDs contained in GID 4 may be represented by offset N3+1 and length N4−N3+1.

If the aforementioned group-based AIDs are introduced, channel access may be allowed in a different time interval according to GIDs, so that the problem caused by the insufficient number of TIM elements with respect to a large number of STAs can be solved and at the same time data can be efficiently transmitted/received. For example, during a specific time interval, channel access is allowed only for STA(s) corresponding to a specific group and channel access to the remaining STA(s) may be restricted. A predetermined time interval in which access to only specific STA(s) is allowed may also be referred to as a restricted access window (RAW).

Channel access based on GID will now be described with reference to FIG. 13(c). FIG. 13(c) exemplarily illustrates a channel access mechanism according to a beacon interval when AIDs are divided into three groups. A first beacon interval (or a first RAW) is a specific interval in which channel access to STAs corresponding to AIDs contained in GID 1 is allowed and channel access of STAs contained in other GIDs is disallowed. To implement this, a TIM element used only for AIDs corresponding to GID 1 is contained in a first beacon. A TIM element used only for AIDs corresponding to GID 2 is contained in a second beacon frame. Accordingly, only channel access to STAs corresponding to the AIDs contained in GID 2 is allowed during a second beacon interval (or a second RAW). A TIM element used only for AIDs having GID 3 is contained in a third beacon frame, so that channel access to STAs corresponding to the AIDs contained in GID 3 is allowed during a third beacon interval (or a third RAW). A TIM element used only for AIDs having GID 1 is contained in a fourth beacon frame, so that channel access to STAs corresponding to the AIDs contained in GID 1 is allowed during a fourth beacon interval (or a fourth RAW). Thereafter, only channel access to STAs belonging to a specific group indicated by a TIM contained in a corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is cyclical or periodic according to the beacon interval, the scope of the present invention is not limited thereto. That is, only AID(s) contained in specific GID(s) may be contained in a TIM element, so that channel access only to STA(s) corresponding to the specific AID(s) is allowed during a specific time interval (e.g. a specific RAW) and channel access to the remaining STA(s) is disallowed.

The aforementioned group-based AID allocation scheme may also be referred to as a hierarchical structure of a TIM. That is, a total AID space is divided into a plurality of blocks and channel access to STA(s) (i.e. STA(s) of a specific group) corresponding to a specific block having any one of values other than '0' may be allowed. Therefore, since a large-sized TIM is divided into small-sized blocks/groups, an STA can easily maintain TIM information and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of an AID bitmap may represent a page ID (i.e. PID), the next N2 bits may represent a block ID, the next N3 bits may represent a sub-block ID, and the remaining bits may represent the position of STA bits contained in a sub-block.

Improved Channel Access Method

If group-based AIDs are allocated/managed, STAs belonging to a specific group may use a channel only in a "group channel access interval" (or a RAW) allocated to the corresponding group. If an STA supports an M2M application, traffic for the STA is characteristically generated at a long period (e.g. a few tens of minutes or a few hours). Since such an STA does not need to frequently maintain an awake state, the STA desirably operates in a sleep mode for a long time and transitions to an awake state occasionally (i.e. it is desirable to set a wakeup interval of the STA to be long). In this way, an STA having the wakeup interval of a long period may be referred to as an STA operating in a "long-sleeper" or "long-sleep" mode. Notably, long wakeup period setting is not always limited to the purpose of M2M communication and may be applied according to the state of an STA or a peripheral environment even in a general WLAN operation.

If a wakeup interval is set, an STA may determine whether the wakeup interval has elapsed based on a local clock thereof. However, since a low-cost oscillator is generally used as the local clock of the STA, an error occurrence probability is high and may more increase over time if the STA operates in a long-sleep mode. Therefore, time synchronization of the STA which is occasionally awake may not be equal to time synchronization of an AP. For example, although the STA has transitioned to the awake state by calculating a timing at which it is capable of receiving a beacon, the STA may not actually receive the beacon transmitted by the AP at the timing. That is, the STA may miss the beacon due to clock drift and such a problem may frequently occur when the STA operates in a long-sleep mode.

Figure 14:
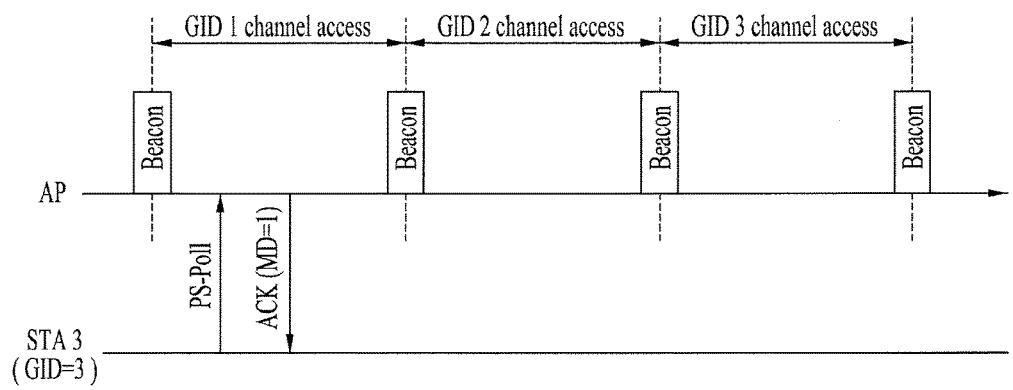
Figure 15:
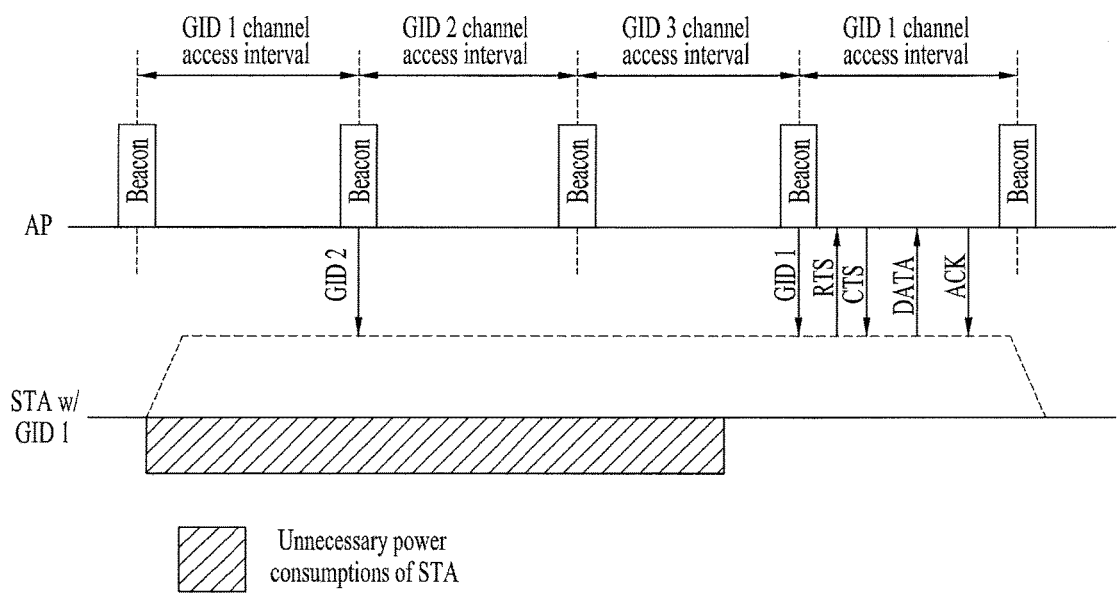

FIGS. 14 to 16 are diagrams illustrating exemplary operations of an STA in the case in which a group channel access interval is set.

In an example of FIG. 14, STA3 belonging to group 3 (i.e. GID=3) may wake up in a channel access interval allocated to group 1 (i.e. GID=1) and perform PS-Poll for requesting an AP to transmit a frame. Upon receiving PS-Poll from the STA, the AP transmits an ACK frame to STA3. If buffered data to be transmitted to STA3 is present, the AP may provide information indicating the data (i.e. information indicating that there is data to be transmitted) through the ACK frame. For example, the information may be indicated by setting a value of a 1-bit "More Data" field (or MD field) included in the ACK frame to 1 (i.e. MD=1).

In this case, since STA3 has transmitted PS-Poll at a time belonging to the channel access interval of group 1, the AP that has recognized that there is data to be transmitted to STA3 does not transmit the data immediately after transmission of the ACK frame and transmits the data to STA3 in a channel access interval (GID 3 channel access of FIG. 14) allocated to group 3 to which STA3 belongs.

In terms of STA3, since the ACK frame, the MD field of which is set to 1 (MD=1), has been received from the AP, STA3 continues to wait for data transmission from the AP. That is, in the example of FIG. 14, since STA3 has not received a beacon immediately after wakeup, STA3 transmits PS-Poll to the AP, under the assumption that a wakeup time of STA3 according to calculation based on a local clock of STA3 may be a channel access interval allocated to a group to which STA3 belongs and data to be transmitted to STA3 may be present. Alternatively, STA3 may transmit PS-Poll to the AP in order to receive data if there is data to be transmitted thereto by any change, under the assumption that time synchronization may not be correct due to operation in a long-sleep mode. The ACK frame received by STA3 from the AP indicates that there is data to be transmitted to STA3 and, therefore, STA3 continues to wait for data reception under the assumption that channel access thereof is a permitted. STA3 unnecessarily consumes power although data reception is not permitted until time synchronization is correctly performed using information included in the next beacon.

Particularly, since STA3 operating in a long-sleep mode cannot frequently receive the beacon, STA3 may perform CCA (clear-channel assessment) even in an interval other than a channel access interval thereof, thereby unnecessarily consuming power.

Next, FIG. 15 exemplarily shows the case in which an STA having GID 1 (i.e. belonging to group 1) misses a beacon frame at a wakeup timing. That is, the STA that has not received a beacon including a GID (or PID) allocated thereto continues to remain in an awake state until a beacon including a GID (or PID) allocated thereto is received. That is, even if a wakeup timing of the STA is a channel access interval allocated to the STA, since the STA has not confirmed whether a TIM transmitted through the beacon includes a GID (or PID) thereof, the STA is unable to know whether the corresponding timing is the channel access interval allocated to a group thereof.

Thus, in the example of FIG. 15, the STA switched to the awake state from a sleep mode remains in the awake state until the fourth beacon including a GID (i.e. GID 1) thereof is received after missing the first beacon, thereby generating unnecessary power consumption. Consequently, the STA can receive the beacon including GID 1 only after power is unnecessarily consumed and then perform RTS transmission, CTS reception, data frame transmission, and ACK reception.

FIG. 16 shows the case in which an STA wakes up in a channel access interval of another group. For example, an STA having GID 3 may wake up in a channel access interval of GID 1. Namely, the STA having GID 3 unnecessarily consumes power until a beacon corresponding to the GID thereof is received after waking up. Upon receipt of a TIM indicating GID 3 in the third beacon, the STA may recognize the channel access interval for a group thereof and perform operations of data transmission and ACK reception after a CCA through RTS and CTS.

RPS Element

A RAW parameter set (RPS) element may include a set of parameters necessary for restricted medium access, only for a group STA. FIG. 17(a) illustrates an RPS element format. Referring to FIG. 17(a), the RPS element format may include RAW assignment fields for group 1 to group N. Specifically, an N-th RAW assignment field may include a PRAW Indication subfield, a Same Group Indication subfield, a PRAW Indication subfield, a RAW Group (optionally present) subfield, a RAW Start Time subfield, a RAW Duration subfield, an Options subfield, and a RAW Slot Definition subfield. The PRAW Indication subfield indicates whether a current RAW-N assignment field is for a RAW or a periodic RAW (PRAW). If the PRAW Indication subfield is set to 0, this indicates that the current RAW-N assignment field is for a RAW and, if it is set to 1, this indicates that the current RAW-N assignment field is for a PRAW.

FIG. 17(b) illustrates configuration of RAW-N assignment when the PRAW Indication subfield is set to 0 and FIG. 17(c) illustrates configuration of RAW-N assignment when the PRAW Indication subfield is set to 1. A Same Group Indication subfield indicates whether a RAW group of current RAW assignment is the same as a RAW group of previous RAW assignment. For initial RAW assignment, the Same Group Indication subfield is set to 0. If the Same Group Indication subfield is set to 0, the RAW assignment field includes, as illustrated in FIG. 17(b), a RAW Group subfield, a RAW Start Time subfield, a RAW Duration subfield, an Options subfield, a RAW Slot Definition subfield, a Channel Indication subfield, and an AP in Doze State subfield. If the Same Group Indication subfield is set to 1, the RAW Group subfield does not appear in a current RAW assignment field and a RAW group is the same as a previous RAW group.

Figure 18:
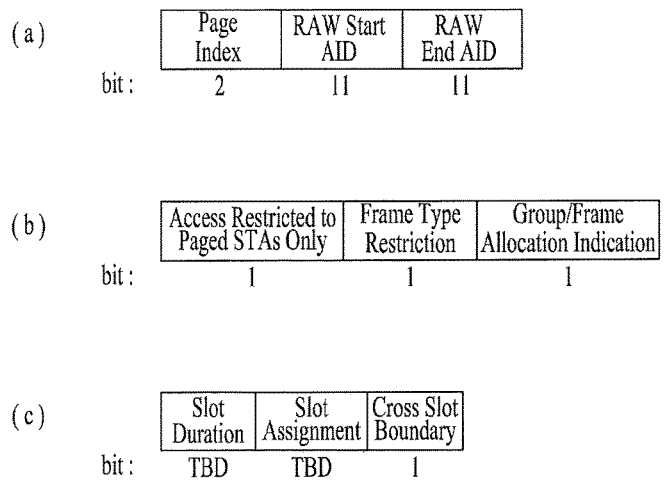

The RAW Group subfield indicates an AID of an STA, restricted access of which is permitted in a RAW interval. The RAW Group subfield may include, as illustrated in FIG. 18(a), a Page Index subfield, a RAW Start AID subfield, and a RAW End AID subfield. The Page Index subfield indicates a page index of a subset of an AID, the RAW Start AID subfield indicates 11 least significant bits (LSBs) of an STA having the lowest AID allocated to a RAW, and the RAW End AID subfield indicates 11 LSBs of an STA having the highest AID. The RAW Start Time subfield indicates a duration from a beacon transmission end time to a RAW start time, given in time units (TU).

FIG. 18(b) illustrates the Options subfield. The Options subfield indicates that the PRAW Indication subfield is set to 0 and includes a Paged STAs' Access subfield, a Frame Type Restriction subfield, and a Resource Allocation Frame Presence Indicator subfield.

FIG. 18(c) illustrates the RAW Slot Definition subfield. In FIG. 18(c), the Slot Duration subfield indicates a time slot duration of an equivalent interval in a RAW. If a value of the Slot Duration subfield is equal to a value of the RAW Duration field, all STAs in a RAW group perform contention for medium access in all RAW durations. A Slot Assignment subfield indicates a slot allocated to STAs based on a location in a TIM element. A Cross Slot Boundary subfield indicates whether to cross a slot boundary to which transmission which is being performed by an STA is allocated.

Resource Assignment Frame Format

Figure 19:
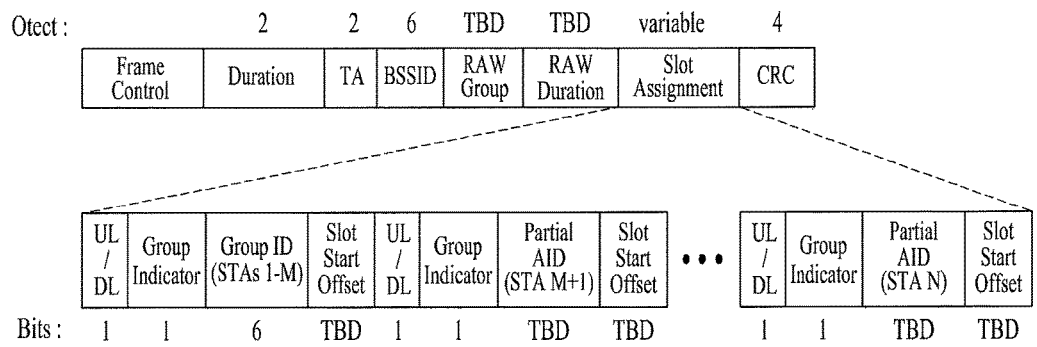
FIG. 19 is a diagram for explaining a resource assignment frame.

FIG. 19 illustrates a resource assignment frame format according to the prior art. A resource assignment frame may be transmitted by an AP at the start part of a RAW if restricted medium access in a BSS is permitted. The resource assignment frame may be transmitted to all STAs in a RAW group in order to determine whether there is buffered DL data for a paged STA and to indicate a time slot allocated for both UL and DL service durations. The resource assignment frame may include a Frame Control field, a Duration field, an AID field, a BSSID field, a RAW Group field, a RAW Duration field, a Slot Assignment field, and a CRC field. The Duration field may indicate the length of the resource assignment frame and the TA field may indicate a partial MAC address of an AP that transmits a current resource assignment frame. The BSSID field may indicate an ID for identifying a BSS and the RAW Group field may indicate an AID of an STA allocated to a RAW. The RAW Duration field may include length information of a current RAW in which the resource assignment frame is transmitted.

The Slot Assignment field provides address information of an STA/MU group of STAs and provides channel access slot information corresponding to the address information. The Slot Assignment field may include a UL/DL subfield indicating UL/DL direction information of each STA/assigned STA or an MU group of STAs, a Group Indicator subfield indicating whether information is for each STA or for an MU group of STAs, a Group ID/Partial AID subfield including group ID information in the case of an MU group of STAs and including partial AID information of a corresponding STA in the case of each STA, and a Slot Start Offset subfield including channel access slot information. When only DL is assumed in MU MIMO applied to an MU group of STAs, the UL/DL subfield is reserved. In FIG. 19, the UL/DL subfield, the Group Indicator subfield, the Group ID subfield, and the Slot Start Offset subfield may constitute a slot assignment field for an MU group as one block. In addition, the UL/DL subfield, the Group indicator subfield, the Partial AID subfield, and the Slot Start Offset subfield may constitute a slot assignment field for each STA as one block. That is, the slot assignment field may include one or more blocks, each block for either an MU group of STAs or each STA. It may be understood that the slot assignment field includes one or more slot assignment fields (blocks), each field (block) for either an MU group of STAs or each STA. Accordingly, a 'unit block/assignment block/block' described hereinafter may constitute a slot assignment field and indicate a slot assignment field n (where n is an integer) for either an MU group of STAs or each STA. That is, a block for an MU group will hereinafter refer to a slot assignment field for an MU group and a block for each STA will hereinafter refer to a slot assignment field for each STA.

In the case of a slot assignment field among the above-described conventional resource assignment frame formats, each unit block contains fixed overhead of a total of 2 bits for a 1-bit UL/DL subfield and a 1-bit Group Indicator subfield. Especially, due to the 1-bit Group Indicator subfield, the number of bits capable of being used to indicate a partial AID of each STA is reduced. That is, the Partial AID subfield, which may be composed of 7 bits, is configured by 6 bits. Since a partial AID is composed of partial information of the AID, reduction by one bit has significant effects (e.g. false alarm issue, etc.). Considering the fact that STAs to which resources are allocated generally includes more individual STAs than STAs of an MU group, the effect of reduction by a bit will be more significant. In addition, since unit block information is configured in octet units, one additional octet may be unnecessarily needed or the length of a Slot Start Offset subfield needs to be reduced if a partial AID of sufficient size should be configured in the process of adjusting the size of the unit block information.

Hereinafter, operations of an improved resource assignment frame format, an STA of an MU group related to the format, and each STA/assigned STA related to the format will be described in consideration of the above-described statements according to an embodiment of the present invention. In the following description, a 'unit block/assignment block/block' refers to a slot assignment field, a block for an MU group refers to a slot assignment field for an MU group, and a block for each STA refers to a slot assignment field for each STA, as mentioned previously.

Resource Assignment Frame Format According to Embodiment of the Present Invention In a resource assignment frame according to an embodiment of the present invention, a block for an MU group of STAs may include an End subfield instead of the conventional UL/DL subfield. Namely, if only DL is assumed only in MU MIMO, the UL/DL subfield is reserved without being used. In other words, a channel access assignment block for an MU group of STAs uses the first bit as an end bit (termination bit indicting end of MU (EOM) group block) indicating that a current block is the last block for an MU group of STAs.

More specifically, the first bit, i.e. an End (or EOM) subfield, of a block for an MU group of STAs may indicate whether a current block is the last block for an MU group. For example, if the End subfield is set to 0, this may indicate 'No termination/No end of block', i.e. indicate that the block is not the last block for the MU group and that a subsequent block for the MU group is present. If the End subfield is set to 1, this may indicate 'Termination/End of block', i.e. indicate that the block is the last block for the MU group and that one or more blocks for each STA are present or no block for MU group is present. (The exemplary value of the End subfield bit may also be conversely used.)

Figure 20:
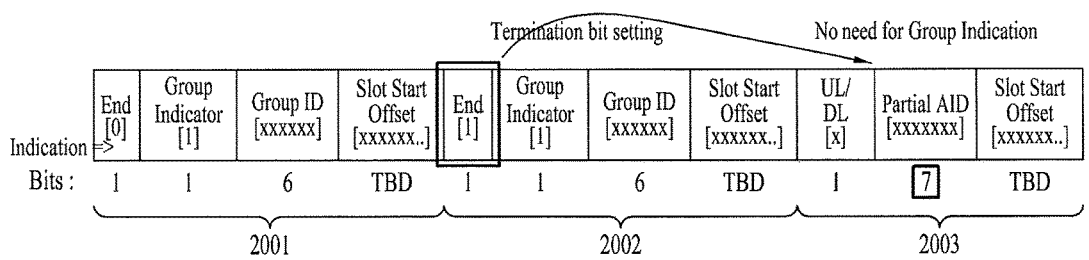
FIGS. 20 to 24 are diagrams for explaining a resource assignment frame according to an embodiment of the present invention.

For the End subfield, blocks for the MU group including the End subfield are sequentially located first at beginning of blocks of one or more slot assignment field. For example, if a total of three blocks (two blocks 2001 and 2002 for MU groups and one block 2003 for each STA) are present in a resource assignment frame, as illustrated in FIG. 20, the blocks for MU groups may be located at the first and second blocks starting from the first block among the blocks of the resource assignment frame. The block of each STA may be located after the last block for the MU group. That is, the block for each STA is allocated after all blocks for MU groups are allocated. Through this configuration, a Group Indicator subfield may be omitted from the block for each STA, whereas the conventional block for each STA should include the Group Indicator subfield. In other words, the Group Indicator subfield is not needed in each block for each STA, because an STA can be aware that a specific block is the last block for an MU group of STAs through the End subfield and that the next block, if present, is for a block for each STA.

FIG. 20 illustrates an exemplary resource assignment frame format including the afore-mentioned End subfield.

Referring to FIG. 20, an exemplary slot assignment field of a resource assignment frame includes two blocks 2001 and 2002 for MU groups of STAs and one block for each STA. Each of the blocks for MU groups of STAs includes the above-mentioned End subfield. The first block 2001 for an MU group of STAs includes an End bit value set to 0 because the block 2001 is not the last block for an MU group of STAs. The second block 2002 for an MU group of STAs includes an End bit value set to 1 because the block 2002 is the last block for an MU group of STAs. It can be seen that the block for each STA includes a UL/DL subfield, a Partial AID subfield, and a Slot Start Offset subfield.

In the above example, an STA may be implicitly aware that the first bit of the first block is an End subfield rather than a UL/DL field, through the second bit of the first block set to 1. The STA may recognize that a block for an MU group of STAs is further present in a subsequent block, through the End bit set to 0. The STA may recognize that the first bit of the second block is the End subfield, through a Group Indicator subfield set to 1 in the second block for an MU group of STAs. Through the End subfield set to 1, the STA may also be aware that the second block is the last block for an MU group of STAs. In other words, the STA may implicitly recognize that, through the End subfield, a block for each STA is present or no assignment blocks for MU group are present after a current block. Since the STA recognizes that the third assignment block is a block for each STA, the STA may determine whether a corresponding link is UL or DL through the first bit of the third block and judge whether the next 7 bits corresponds to an AID thereof. If the 7 bits corresponds to the AID of the STA, the STA may determine a slot in which access is to be performed through a Slot Start Offset subfield.

Figure 21:
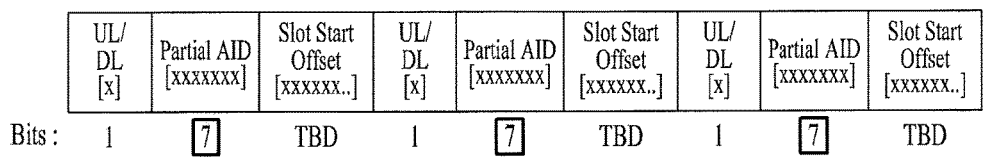

FIG. 21 shows the case in which a resource assignment frame does not include a block for an MU group of STAs, that is, the case in which the resource assignment frame includes only one or more individual blocks, each block for each STA, when the above-described End subfield is applied. As stated above, since the first bit of a block for an MU group of STAs is used as the End subfield, a Group Indicator subfield is not included in a block for each STA. Accordingly, when only blocks for each STA are present without a block for an MU group of STAs, a slot assignment field may be configured as illustrated in FIG. 21. The block for an MU group of STAs and the block for each STA may be equal in size and/or overall assignment structures but detailed field configurations of therefor may be differently defined.

Notably, in FIG. 21, presence or absence of a block for an MU group of STAs needs to be specified/indicated in a current resource assignment frame. To this end, the resource assignment frame may include an indicator indicating whether the block for an MU group of STAs is present.

Figure 22:
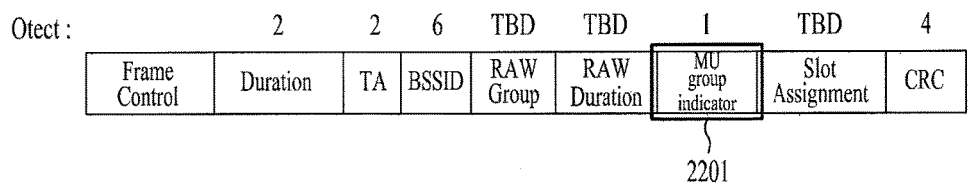

That is, a resource assignment frame according to the embodiment of the present invention may include an MU group indicator indicating whether a block for an MU group of STAs is present in a current resource assignment frame. FIG. 22 illustrates a resource assignment frame including an MU group indicator 2201. Referring to FIG. 22, the resource assignment frame according to the embodiment of the present invention may include the 1-bit MU group indicator 2201 immediately before a field for slot assignment. Obviously, the MU group indicator in the resource assignment frame may be located at another position.

As another example, a RAW before the resource assignment frame may include an indication bit indicating that resource assignment will be performed due to presence of an MU group of STAs in corresponding beacon interval. That is, presence or absence of the MU group of STAs may be indicated through the indicator.

As another example, if a space for containing the MU group indicator is not sufficient in the resource assignment frame, the MU group indicator may be included in an RPS information element transmitted from an AP before transmission of the resource assignment frame, so that whether an MU group (STAs) is present may be indicated. If channel access assignment information for an MU group (STAs) is included in a specific RAW-N assignment field in the RPS information element, the (MU) group indicator may be indicated in the RAW-N assignment field so that an STA can recognize the resource assignment frame during later decoding.

Figure 23:
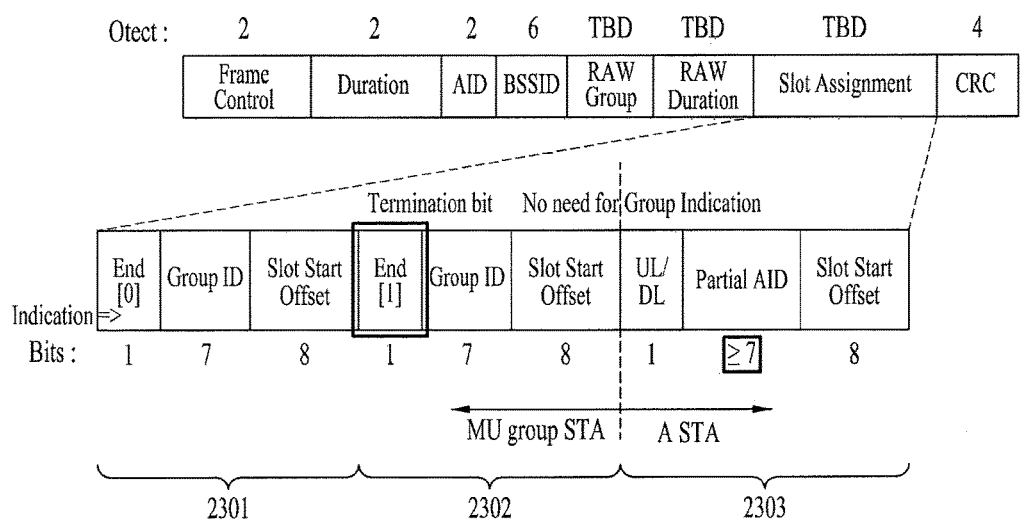

If presence or absence of a block for an MU group of STAs is indicated through the MU group indicator (or indication bit), the block for the MU group of STAs does not need to include the Group Indicator subfield. That is, as illustrated in FIG. 23, each of blocks 2301 and 2302 for MU groups of STAs may include an End subfield, a Group ID subfield, and a Slot Start Offset subfield.

Figure 24:
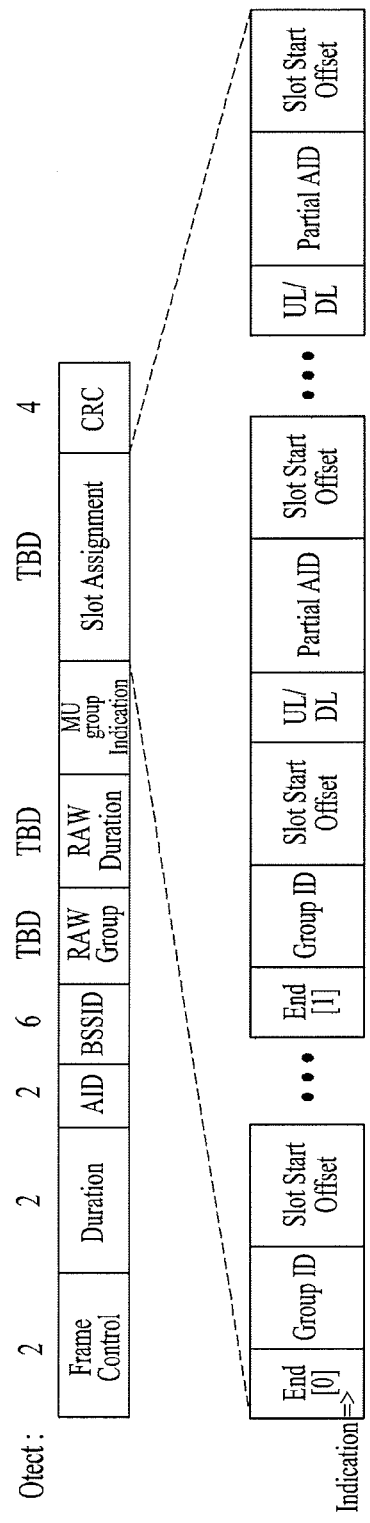

Hereinafter, operations of an STA of an MU group and each STA receiving the above-described resource assignment frame of the present invention will be described. That is, the following description is based on a resource assignment frame including the above-described configurations as illustrated in FIG. 24. In more detail, the resource assignment frame of FIG. 24 includes an MU group indicator indicating whether a current resource assignment frame includes a block for an MU group of STAs and the block for the MU group of STAs includes an End subfield, a Group ID subfield, and a Slot Start Offset subfield. In addition, a block for each STA includes a UL/DL subfield, a Partial AID subfield, and a Slot Start Offset subfield. Although FIG. 24 exemplarily shows the case in which the resource assignment frame includes a plurality of blocks for MU group of STAs and a block for each STA, the resource assignment frame may include only a slot assignment field for each STA when the MU group indicator indicates that the resource assignment frame does not include a block for an MU group of STAs. If the MU group indicator indicates that the resource assignment frame includes the block for an MU group of STAs, the resource assignment frame may include at least one block for an MU group of STAs and zero or more blocks for each STA. For convenience, if the group indicator field is set to 1, description will be given on the premise that the resource assignment frame includes a block for an MU group of STAs. The term 'slot assignment field' is used instead of the term 'block' described above.

Figure 25:
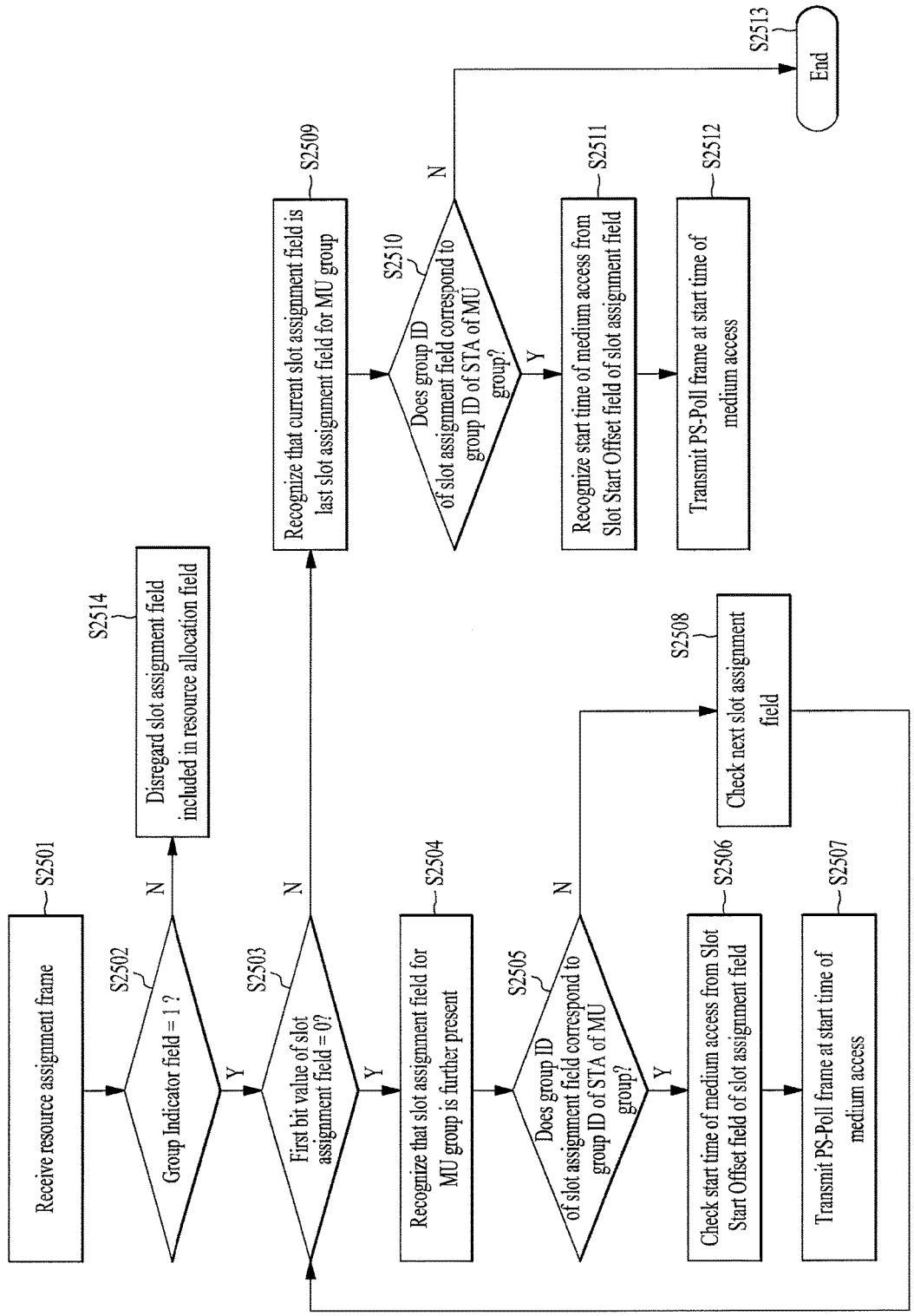
FIG. 25 is a diagram for explaining operation of an STA of an MU group according to an embodiment of the present invention.

Operation of an STA of an MU Group Receiving a Resource Assignment Frame an According to Embodiment of the Present Invention Referring to FIG. 25, upon receiving a resource assignment frame (S2501), an STA of an MU group checks a group indicator field contained in the resource assignment frame (S2502). If the group indicator field is set to 1, i.e. if the group indicator field indicates that a slot assignment field for an MU group of STAs is present in the resource assignment frame, the STA of an MU group may determine a slot start offset based on the slot assignment field. Specifically, if the MU group indicator field is set to 1, the STA of the MU group determines whether a value of the first bit (End subfield) of the slot assignment field is set to 0 (S2503).

If the value of the first bit is 0, the STA of the MU group recognizes that the slot assignment field for the MU group of STAs is further present (S2504) and determines whether the next subfield (Group ID subfield) of a subfield corresponding to the first bit corresponds to a group ID thereof (S2505). That is, the STA of the MU group compares the Group ID subfield with a group ID thereof. As a determination/comparison result, if the Group ID subfield corresponds to the group ID of the STA of the MU group, the STA of the MU group may check a start time of medium access from a Slot Start Offset subfield which is the next subfield of the Group ID subfield (S2506) and transmit a PS-Poll frame at the start time of medium access. If a group ID of the Group ID subfield is not equal to the group ID of the STA of the MU group in step S2505, the STA of the MU group may check the next slot assignment field (S2508).

If the value of the first bit of the slot assignment field is not 0 in step S2503, the STA of the MU group recognizes that a current slot assignment field is the last block (slot assignment field) therefor (S2510) and determines whether the Group ID subfield corresponds to a group ID thereof (S2505). That is, the STA of the MU group compares the Group ID subfield with the group ID thereof. As a determination/comparison result, if the Group ID subfield corresponds to the group ID of the STA of the MU group, the STA of the MU group may recognize a start time of medium access from a Slot Start Offset subfield which is the next subfield of the Group ID subfield (S2511) and transmit a PS-Poll frame at the start time of medium access (S2512). If the Group ID field does not correspond to the group ID of the STA of the MU group in step S2510, since the STA of the MU group is aware that the slot assignment field for the MU group of STAs is not present after a current slot assignment field, the STA of the MU group does not perform processing such as additional comparison for slot assignment detection and ends the operation (S2513).

If the group indicator field value is not 1 in step S2502, i.e. if the group indicator field value indicates that the slot assignment field for the MU group of STAs is not present in a current resource assignment frame, the STA disregards slot assignment field(s) included in the resource assignment frame (S2514).

Figure 26:
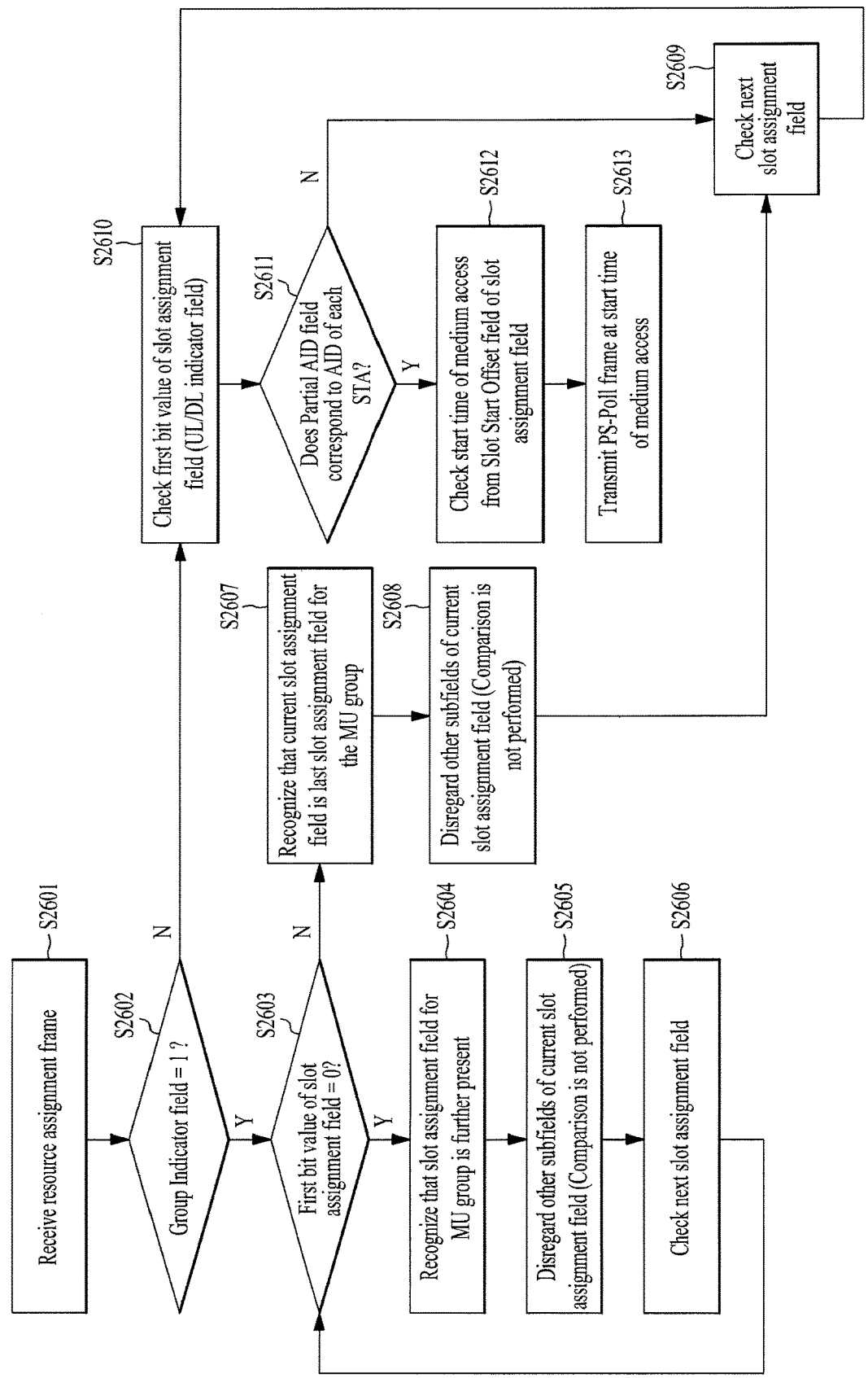
FIG. 26 is a diagram for explaining operation of each STA according to an embodiment of the present invention.

Operations of Each/Assigned STA Receiving Resource Assignment Frame According to Embodiment of the Present Invention FIG. 26 illustrates operation of each STA (i.e. STA irrelevant to an MU group) receiving a resource assignment frame according to an embodiment of the present invention.

Each STA receives the resource assignment frame according to the embodiment of the present invention (S2601) and determines whether a group indicator field is set to 1 (S2602). If the group indicator field is set to 1, i.e. if the group indicator field indicates that a slot assignment field for an MU group of STAs is present in the resource assignment frame, each STA may determine a slot start offset through the first bit of the slot assignment field for an MU group of STAs. Since the first bit of the slot assignment field for the MU group of STAs, that is, an End subfield, indicates whether a current slot assignment field is the last slot assignment field for the MU group of STAs, the STA may recognize whether the slot assignment field for the MU group of STAs will be continued. In other words, the STA does not need to compare IDs and/or determine a slot start offset with respect to a slot assignment field having the End subfield set to 1 and the previous slot assignment fields. The STA may perform ID comparison and/or slot start offset determination with respect to slot assignment fields starting from the next slot assignment field of a slot assignment field having the End subfield set to 1.

Next, if the group indicator field is set to 1, the STA determines whether a value of the first bit of a slot assignment field is 0 (S2603). If the first bit of the slot assignment field is 0, the STA recognizes that the slot assignment field for the MU group is further present (S2604) and disregards the other subfields of a current slot assignment field (or does not perform comparison) (S2605). Then, the STA checks the next slot assignment field (i.e. returns to step S2603) (S2606). If the End bit of the slot assignment field is not 0 in step S2603, the STA recognizes that the current slot assignment field is the last slot assignment field for the MU group (S2607) and disregards the other subfields of the current slot assignment field (S2608).

If a subsequent slot assignment field is present, the STA checks the next slot assignment field (S2609). In this case, since the STA recognizes that the next slot assignment field is a slot assignment field for each STA, the STA recognizes the first subfield of the slot assignment field as a UL/DL subfield and checks a bit value (S2610). The STA determines whether the next subfield, that is, a Partial AID subfield, is equal to an AID thereof (S2611). If the AIDs are equal, the STA checks a start time of medium access from a Slot Start Offset subfield (S2612). Next, the STA may transmit a PS-Poll frame to an AP at the start time of medium access (S2613). If the AIDs are not the same in step S2611, the STA checks the next slot assignment field (when present) (S2609).

The above described various embodiments of the present invention may be independently applied or two or more embodiments thereof may be simultaneously applied.

Figure 27:
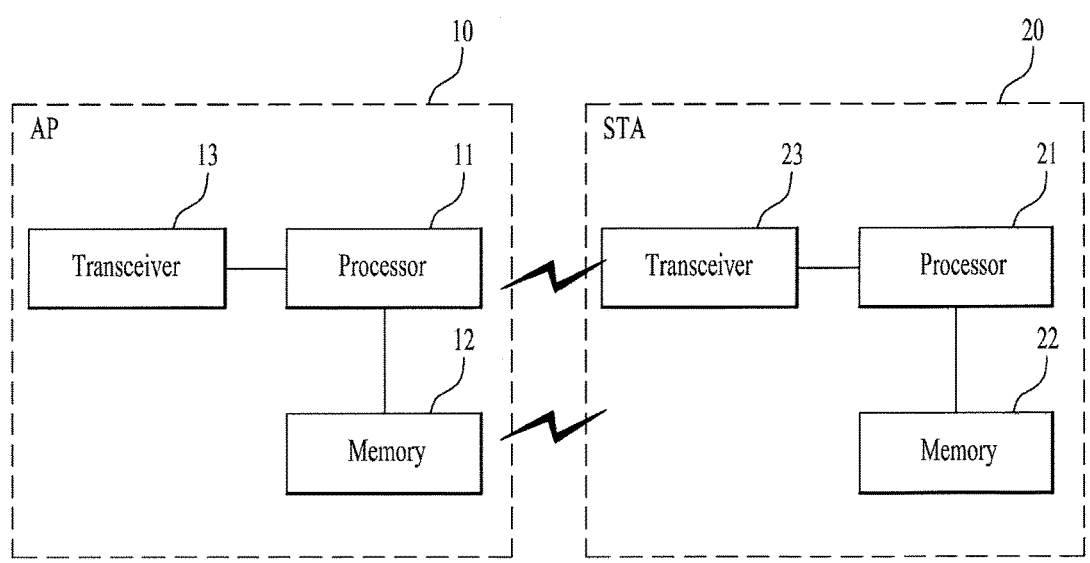
FIG. 27 is a block diagram illustrating a radio device according to an embodiment of the present invention.

FIG. 27 is a block diagram illustrating a radio device according to an embodiment of the present invention.

An AP 10 may include a processor 11, a memory 12, and a transceiver 13. An STA 20 may include a processor 21, a memory 22, and a transceiver 23. The transceivers 13 and 23 may transmit/receive radio signals and may implement a physical layer based on an IEEE 802 system. The processors 11 and 21 are connected to the transceivers 13 and 21, respectively, and may implement a physical layer and/or a MAC layer based on the IEEE 802 system. The processors 11 and 21 may be configured to perform operations according to the above described various embodiments of the present invention. Modules for implementing operations of the AP and STA according to the above described various embodiments of the present invention may be stored in the memories 12 and 22 and may be carried out by the processors 11 and 21. The memories 12 and 22 may be included in the processors 11 and 21 or may be installed at the exterior of the processors 11 and 21 to be connected by a known means to the processors 11 and 21.

The overall configurations of the AP and STA may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based on an IEEE 802.11 system, the embodiments may be applied in the same manner to various mobile communication systems.

The invention claimed is:

1. A method for performing channel access by a station (STA) of a multi-user (MU) group in a wireless local area network (WLAN), the method comprising:
receiving a resource allocation frame including one or more slot assignment fields and a group indicator field indicating that the one or more slot assignment fields include at least one MU group slot assignment field;
searching a specific MU group slot assignment field for the STA from a beginning of the one or more slot assignment fields to a last MU group slot assignment field; and
performing channel access according to the specific MU group slot assignment field for the STA,
wherein in searching the specific MU group slot assignment field,
the STA determines whether a corresponding MU group slot assignment field is the last MU group slot assignment field by checking an end of MU (EOM) indicator of the corresponding MU group slot assignment field, and
the STA identifies whether the corresponding MU group slot assignment field is the specific MU group slot assignment field for the STA using a group identifier (GID) for the STA.

2. The method of claim 1, further comprising:
obtaining information on a start time of the channel access from the specific MU group slot assignment field.

3. The method of claim 2, wherein performing the channel access comprises:
transmitting a power save-poll (PS-Poll) frame after contention at the start time of the channel access.

4. The method of claim 1, wherein when a GID value of the corresponding MU group slot assignment field does not correspond to the GID for the STA, and the EOM indicator indicates that the corresponding MU group slot assignment field is not the last MU group slot assignment field, a subsequent MU group slot assignment field following the corresponding MU group slot is searched.

5. The method of claim 4, wherein when a GID value of the subsequent MU group slot assignment field does not corresponds correspond to the GID for the STA, and the EOM indicator indicates that the subsequent MU group slot assignment field is the last MU group slot assignment field, the searching of the specific MU group slot assignment field is terminated.

6. The method of claim 1, wherein an initial bit in each MU group slot assignment field is used for the EOM indicator, and a predetermined number of bits following the initial bit is used for a GID field.

7. The method of claim 1, wherein when the one or more slot assignment fields include at least one slot assignment field for individual STA, the at least one slot assignment field for individual STA is located after the last MU group slot assignment field.

8. The method of claim 7, wherein the at least one slot assignment field for individual STA does not include the EOM indicator.

9. The method of claim 8, wherein the at least one slot assignment field for individual STA includes a partial association identifier value instead of a GID value.

10. A non-transitory computer readable medium recorded thereon a program for executing the method of claim 1.

11. A station (STA) of a multi-user (MU) group performing channel access in a wireless local area network (WLAN), the STA comprising:
a transceiver to receive a resource allocation frame including one or more slot assignment fields and a group indicator field indicating that the one or more slot assignment fields include at least one MU group slot assignment field; and
a processor to search a specific MU group slot assignment field for the STA from a beginning of the one or more slot assignment fields to a last MU group slot assignment field, and to perform channel access according to the specific MU group slot assignment field for the STA,
wherein in searching the specific MU group slot assignment field,
the processor determines whether a corresponding MU group slot assignment field is the last MU group slot assignment field by checking an end of MU (EOM) indicator of the corresponding MU group slot assignment field, and
the processor identifies whether the corresponding MU group slot assignment field is the specific MU group slot assignment field for the STA using a group identifier (GID) for the STA.

12. The STA of claim 11, wherein the processor obtains information on a start time of the channel access from the specific MU group slot assignment field.

13. The STA of claim 12, wherein the processor controls the transceiver to transmit a power save-poll (PS-Poll) frame after contention at the start time of the channel access.

14. The STA of claim 11, wherein when a GID value of the corresponding MU group slot assignment field does not correspond to the GID for the STA, and the EOM indicator indicates that the corresponding MU group slot assignment field is not the last MU group slot assignment field, a subsequent MU group slot assignment field following the corresponding MU group slot is searched.

15. The STA of claim 14, wherein when a GID value of the subsequent MU group slot assignment field does not correspond to the GID for the STA, and the EOM indicator indicates that the subsequent MU group slot assignment field is the last MU group slot assignment field, the searching of the specific MU group slot assignment field is terminated.

16. The STA of claim 11, wherein an initial bit in each MU group slot assignment field is used for the EOM indicator, and a predetermined number of bits following the initial bit is used for a GID field.

17. The STA of claim 11, wherein when the one or more slot assignment fields include at least one slot assignment field for individual STA, the at least one slot assignment field for individual STA is located after the last MU group slot assignment field.

18. The STA of claim 17, wherein the at least one slot assignment field for individual STA does not include the EOM indicator.

19. The STA of claim 18, wherein the at least one slot assignment field for individual STA includes a partial association identifier value instead of a GID value.

* * * * *